(12) United States Patent
Wen et al.

(10) Patent No.: US 11,430,446 B1
(45) Date of Patent: Aug. 30, 2022

(54) DIALOGUE SYSTEM AND A DIALOGUE METHOD

(71) Applicant: PolyAI Limited, London (GB)

(72) Inventors: Tsung-Hsien Wen, London (GB); Razvan-Emanuel Kusztos, London (GB); Inigo Casanueva-Perez, London (GB); Pei-Hao Su, London (GB); Ivan Vulic, London (GB); Nikola Mrksic, London (GB); Daniela Susanne Gerz, London (GB); Aditya Agarwal, London (GB); Pawel Franciszek Budzianowski, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 17/400,406

(22) Filed: Aug. 12, 2021

(51) Int. Cl.
*G10L 15/26* (2006.01)
*G10L 13/02* (2013.01)

(52) U.S. Cl.
CPC .............. *G10L 15/26* (2013.01); *G10L 13/02* (2013.01)

(58) Field of Classification Search
None
See application file for complete search history.

(56) References Cited

U.S. PATENT DOCUMENTS

| | | | |
|---|---|---|---|
| 6,505,162 B1* | 1/2003 | Wang | G10L 15/22 704/E15.04 |
| 7,421,393 B1 | 9/2008 | Di Fabbrizio et al. | |
| 8,366,554 B1 | 2/2013 | Yuan | |
| 9,189,742 B2 | 11/2015 | London | |
| 9,471,872 B2* | 10/2016 | Anand | G06N 5/02 |
| 10,055,403 B2 | 8/2018 | Bui et al. | |
| 10,424,302 B2 | 9/2019 | Shah et al. | |
| 10,847,141 B2 | 11/2020 | Steedman Henderson et al. | |
| 10,885,906 B2 | 1/2021 | Steedman Henderson et al. | |
| 11,069,001 B1* | 7/2021 | Mascaro | G06Q 40/123 |

(Continued)

OTHER PUBLICATIONS

Bordes, Antoine et al.; "Learning End-to-End Goal-Oriented Dialog" arXiv:1605.07683v4 [cs.CL], Mar. 30, 2017; pp. 1-15.

(Continued)

*Primary Examiner* — Neeraj Sharma
(74) *Attorney, Agent, or Firm* — Pillsbury Winthrop Shaw Pittman LLP; Christopher L. Drymalla

(57) ABSTRACT

There is provided a dialogue system comprising:
an input for obtaining an input signal relating to speech or text input provided by a user;
an output for outputting speech or text information specified by a determined dialogue act; and
a processor configured to:
determine dialogue information from the input signal;
determine the dialogue act based on the determined dialogue information, wherein determining the dialogue act comprises:
selecting a next state from a plurality of states, wherein each of the plurality of states comprises information specifying a dialogue act and transition information specifying a transition to another state, the transitions defining one or more dialogue pathways, wherein selecting the next state comprises selecting a state which is specified by the transition information in a current state or selecting a state which is specified by a rule in a first set of one or more rules.

15 Claims, 12 Drawing Sheets

(56) References Cited

U.S. PATENT DOCUMENTS

| | | | |
|---|---|---|---|
| 2005/0055321 A1* | 3/2005 | Fratkina | G06N 5/042 706/50 |
| 2005/0261881 A1 | 11/2005 | Jackson | |
| 2007/0021962 A1* | 1/2007 | Oerder | H04M 7/0012 704/E15.04 |
| 2010/0153324 A1 | 6/2010 | Downs et al. | |
| 2012/0166469 A1 | 6/2012 | Cammert et al. | |
| 2015/0142704 A1* | 5/2015 | London | G06F 40/58 706/11 |
| 2015/0228275 A1* | 8/2015 | Watanabe | G10L 15/22 704/275 |
| 2016/0042735 A1 | 2/2016 | Vibbert et al. | |
| 2016/0171514 A1 | 6/2016 | Frank et al. | |
| 2017/0069000 A1 | 3/2017 | Duleba | |
| 2017/0091171 A1* | 3/2017 | Perez | G06F 40/35 |
| 2017/0193020 A1 | 7/2017 | Yi et al. | |
| 2018/0004729 A1* | 1/2018 | Qiu | G06F 40/205 |
| 2018/0052842 A1 | 2/2018 | Hewavitharana et al. | |
| 2018/0052884 A1 | 2/2018 | Kale et al. | |
| 2018/0052885 A1 | 2/2018 | Gaskill et al. | |
| 2018/0052913 A1 | 2/2018 | Gaskill et al. | |
| 2018/0114142 A1 | 4/2018 | Mueller | |
| 2018/0173698 A1 | 6/2018 | Dubey et al. | |
| 2018/0196881 A1 | 7/2018 | Lundin et al. | |
| 2018/0203833 A1 | 7/2018 | Liang et al. | |
| 2018/0232436 A1* | 8/2018 | Elson | G06F 16/00 |
| 2018/0285465 A1 | 10/2018 | Schaffernoth et al. | |
| 2018/0296925 A1 | 10/2018 | Yuan | |
| 2018/0330721 A1 | 11/2018 | Thomson et al. | |
| 2018/0341871 A1 | 11/2018 | Maitra et al. | |
| 2018/0349412 A1 | 12/2018 | Waldeck et al. | |
| 2018/0350349 A1* | 12/2018 | Liang | G06N 20/00 |
| 2019/0012371 A1 | 1/2019 | Campbell et al. | |
| 2019/0122111 A1 | 4/2019 | Min et al. | |
| 2019/0130904 A1 | 5/2019 | Homma et al. | |
| 2019/0188537 A1 | 6/2019 | Dutta et al. | |
| 2019/0228068 A1* | 7/2019 | Sen | G06F 40/30 |
| 2019/0349321 A1 | 11/2019 | Cai et al. | |
| 2020/0074984 A1 | 3/2020 | Ho et al. | |
| 2020/0090651 A1* | 3/2020 | Tran | G10L 15/22 |
| 2020/0152184 A1 | 5/2020 | Steedman Henderson et al. | |
| 2020/0193265 A1* | 6/2020 | Hill | G06F 16/3329 |
| 2020/0227029 A1 | 7/2020 | Mcconnell | |
| 2021/0065709 A1 | 3/2021 | Duong et al. | |
| 2021/0166684 A1* | 6/2021 | Cohen | G05B 19/042 |
| 2021/0312904 A1 | 10/2021 | Shukla et al. | |

OTHER PUBLICATIONS

Budzianowski, Pawel et al.; "MultiWOZ—A Large-Scale Multi-Domain Wizard-of-Oz Dataset for Task-Oriented Dialogue Modelling" Conference on Empirical Methods in Natural Language Processing, Brussels, Oct. 31-Nov. 4, 2018; pp. 5016-5026.
Burgan, Deeno; "Dialogue Systems & Dialogue Management" Australian Government, Department of Defence Science and Technology, Jan. 2017; pp. 1-71.
Dai, Yinpei et al.; "A Survey on Dialog Management: Recent Advances and Challenges" arXiv:2005.02233v3 [cs.CL], Oct. 25, 2021; pp. 1-20.
El Asri, Layla et al.; "Frames: A Corpus for Adding Memory to Goal-Oriented Dialogue Systems" (2017) available at: https://protect-eu.mimecast.com/s/b-jyCOYPASA6w78cQeEA5?domain=aclweb.org; pp. 1-13.
Eric, Mihail et al.; "Key-Value Retrieval Networks for Task-Oriented Dialogue" SIGDAL 2017 Conference, Saarbrucken, Aug. 15-17, 2017; pp. 37-49.
Eric, Mihail et al.; "MultiWOZ 2.1: A Consolidated Multi-Domain Dialogue Dataset with State Corrections and State Tracking Baselines" arXiv:1907.01669v4 [cs.CL], Dec. 3, 2019; pp. 1-7.
Goyal, Anuj et al.; "Fast and Scalable Expansion of Natural Language Understanding Functionality for Intelligent Agents" NAACL-HLT 2018, New Orleans, Jun. 1-6, 2018; pp. 145-152.
Gritta, Milan et al.; "Conversation Graph: Data Augmentation, Training, and Evaluation for Non-Deterministic Dialogue Management" Transactionsof the Association for Computational Linguistics, vol. 9, 2021; pp. 36-52.
Harms, Jan-Gerrit et al.; "Approaches for Dialog Management in Conversational Agents" Cognitive Services and Intelligent Chatbots Theme Article, IEEE Computer Society, Nov. 15, 2018; pp. 13-22.
Henderson, Matthew et al.; "A Repository of Conversational Datasets" arXiv:1904.06472v2 [cs.CL], May 29, 2019; pp. 1-10.
Henderson, Matthew et al.; "Robust Dialog State Tracking Using Delexicalised Recurrent Neural Networks and Unsupervised Adaptation" (2014) available at: https://protect-eu.mimecast.com/s/NINCCyP9KuNIJBzTI3H-0?domain=svr-ftp.eng.cam.ac.uk; pp. 1-6.
Henderson, Matthew et al.; "The Second Dialog State Tracking Challenge" SIDGAL 2014 Conference, Philadelphia, Jun. 18-20, 2014; pp. 263-272.
Henderson, Matthew et al.; "Word-Based Dialog State Tracking with Recurrent Neural Networks" SIGDAL 2014 Conference, Philadelphia, Jun. 18-20, 2014; pp. 292-299.
Henderson, Matthew; "Machine Learning For Dialog State Tracking: A Review" (2015) available at: https://protect-eu.mimecast.com/s/tDd2CBBPkhVgAL9cKfV63?domain=static.googleusercontent.com; pp. 1-8.
Jiang, Youxuan et al.; "Understanding Task Design Trade-offs in Crowdsourced Paraphrase Collection" 55th Annual Meeting of the Association for Computational Linguistics, Vancouver, Jul. 30-Aug. 4, 2017; pp. 103-109.
Kang, Yiping et al.; "Data Collection for a Production Dialogue System: A Clinc Perspective" NAACL-HLT 2018, New Orleans, Jun. 1-6, 2018; pp. 33-40.
Larson, Stefan et al.; "An Evaluation Dataset for Intent Classification and Out-of-Scope Prediction" Conference on Empirical Methods in Natural Language Processing, Hong Kong, Nov. 3-7, 2019; pp. 1311-1316.
Larsson, S. et al.; "Information state and dialogue management in the TRINDI Dialogue Move Engine Toolkit" Natural Language Engineering 1 (1): 000 000, Mar. 26, 2000; pp. 1-17.
Lemon, Oliver et al.; "Probabilistic Dialogue Modelling" Third SIGdial Workshop on Discourse and Dialogue, Philadelphia, Jul. 2002; pp. 125-128.
Li, Jiwei et al.; "Deep Reinforcement Learning for Dialogue Generation" arXiv:1606.01541v4 [cs.CL] Sep. 29, 2016; pp. 1-11.
Li, Xiujun et al.; "A User Simulator for Task-Completion Dialogues" arXiv:1612.05688v3 [cs.LG] Nov. 13, 2017; pp. 1-14.
Lison, Pierre et al.; "OpenDial: A Toolkit for Developing Spoken Dialogue Systems with Probablistic Rules" 54th Annual Meeting of the Association for Computational Linguistics, Berlin, Aug. 7-12, 2016; pp. 67-72.
Lison, Pierre; "A hybrid approach to dialogue management based on probablistic rules" Computer Speech and Language 34 (2015); pp. 232-255.
Liu, Bing et al.; "Dialogue Learning with Human Teaching and Feedback in End-to-End Trainable Task-Oriented Dialogue Systems" NAACL-HLT 2018, New Orleans, Jun. 1-6, 2018; pp. 2060-2069.
Liu, Xingkun et al.; "Benchmarking Natural Language Understanding Services for building Conversational Agents" arXiv:1903.05566v3 [cs.CL], Mar. 26, 2019; pp. 1-13.
Microsoft "MetaLWOz—Microsoft Research" available at the url: https://www.microsoft.com/en-us/research/project/metalwoz, dated Jun. 14, 2019; retrieved Feb. 5, 2020; pp. 1-5.
Miller, Alexander H. et al.; "ParlAI: A Dialogue Research Software Platform" 2017 EMNLP System Demonstrations, Copenhagen, Sep. 7-11, 2017; pp. 79-84.
Morbini, Fabrizio et al.; "FLoReS: A Forward Looking, Reward Seeking, Dialogue Manager" 4th International Workshop on Spoken Dialogue Systems, Ermenonville, Nov. 28-30, 2012; pp. 1-12.
Mrksic, Nicola et al.; "Multi-domain Dialog State Tracking using Recurrent Neural Networks" 53rd Annual Meeting of the Association for Computational Linguistics, Beijing, Jul. 26-31, 2015; pp. 794-799.

(56) References Cited

OTHER PUBLICATIONS

Mrksic, Nicola et al.; "Neural Belief Tracker: Data-Driven Dialogue State Tracking" 55th Annual Meeting of the Association for Computational Linguistics, Vancouver, Jul. 30-Aug. 4, 2017; pp. 1777-1788.

Mrksic, Nicola et al.; "Semantic Specialization of Distributional Word Vector Spaces using Monolingual and Cross-Lingual Constraints" Transactions of the Association for Computational Linguistics, 2017, vol. 5; pp. 309-324.

Mrksic, Nicola; "Data-Driven Language Understanding for Spoken Dialogue Systems" University of Cambridge, dissertation for the degree of Doctor of Philosophy, Jun. 2018; pp. 1-150.

Peng, Baolin et al.; "Composite Task-Completion Dialogue Policy Learning via Hierarchical Deep Reinforcement Learning" 2017 Conference on Empirical Methods in Natural Language Processing, Copenhagen, Sep. 7-11, 2017; pp. 2231-2240.

Perez, Julien et al.; "Dialog state tracking, a machine reading approach using Memory Network" 15th Conference of the European Chapter of the Association for Computational Linguistics, Valencia, Apr. 3-7, 2017; pp. 305-314.

Rajendran, Janarthanan et al.; "Learning End-to-End Goal-Oriented Dialog with Maximal User Task Success and Minimal Human Agent Use" Transactions of the Association for Computational Linguistics, vol. 7, 2019; pp. 276-386.

Rastogi, Abhinav et al.; "Multi-task learning for Joint Language Understanding and Dialogue State Tracking" SIGDAL 2018 Conference, Melbourne, Jul. 12-14, 2018; pp. 376-384.

Rastogi, Abhinav et al.; "Towards Scalable Multi-domain Conversational Agents: The Schema-Guided Dialogue Dataset" arXiv:1909.05855v1 [cs.CL], Sep. 12, 2019; pp. 1-11.

Ren, Hang et al.; "Optimizing Human-Interpretable Dialog Management Policy Using Genetic Algorithm" arXiv:1605.03915v2 [cs.HC] May 13, 2016; pp. 1-9.

Roy, Nicholas et al.; "Spoken Dialogue Management Using Probabilistic Reasoning" 38th Annual Meeting of the Association for Computational Linguistics, Hong Kong, Oct. 2000; pp. 1-8.

Schatzmann, Jost et al.; "Agenda-Based User Simulation for Bootstrapping a POMDP Dialogue System" NAACL HLT 2007, Companion Volume, Rochester, Apr. 2007; pp. 1-4.

Shah, Pararth et al.; "Bootstrapping a Neural Conversational Agent with Dialogue Self-Play, Crowdsourcing and On-Line Reinforcement Learning" NAACL-HLT 2018, New Orleans, Jun. 1-6, 2018, pp. 41-51.

Shah, Pararth et al.; "Building a Conversational Agent Overnight with Dialogue Self-Play" arXiv:1801.04871v1 [cs.AI], Jan. 15, 2018; pp. 1-11.

Shi, Chen et al.; "Auto-Dialabel: Labeling Dialogue Data with Unsupervised Learning" 2018 Conference on Empirical Methods in Natural Language Processing, Brussels, Oct. 31-Nov. 4, 2018; pp. 684-689.

Su, Pei-Hao et al.; "On-line Active Reward Learning for Policy Optimization in Spoken Dialogue Systems" 54 Annual Meeting of the Association for Computational Linguistics, Berlin, Aug. 7-12, 2016; pp. 2431-2441.

Tseng, Bo-Hsiang et al.; "Transferable Dialogue Systems and User Simulators" Proceedings of the 59th Annual Meeting of the Association for Computations Linguistics, Aug. 1-6, 2021; pp. 152-166.

Tur, Gokhan et al.; "What Is Left To Be Understood In ATIS?" SLT 2010; pp. 19-24.

Wei, Wei et al.; "AirDialogue: An Environment for Goal-Oriented Dialogue Research" 2018 Conference on Empirical Methods in Natural Language Processing, Brussels, Oct. 31-Nov. 4, 2018; pp. 3844-3854.

Wen, Tsung-Hsien et al.; "A Network-based End-to-End Trainable Task-oriented Dialogue System" 15th Conference of the European Chapter of the Association for Computational Linguistics, Valencia, Apr. 3-7, 2017; pp. 438-449.

Williams, Jason D. et al.; "Hybrid Code Networks: practical and efficient end-to-end dialog control with supervised and reinforcement learning" arXiv:1702.03274v2 [cs.AI] Apr. 24, 2017; pp. 1-13.

Xu, Yushi et al.; "Dialogue Management Based on Entities and Constraints" 11th Annual Meeting of the Special Interest Group on Discourse and Dialogue, University of Tokyo, Sep. 24-25, 2010; pp. 87-90.

European Search Report in Application No. 21382443.6-1231 (PN839193EP), dated Nov. 5, 2021; pp. 1-9.

Wikipedia; "Dialog manager" available at: https://en.wikipedia.org/w/index.php?title=Dialogmanager&oldid=996389030, Dec. 26, 2020; pp. 1-9.

\* cited by examiner

DIALOGUE SYSTEM AND A DIALOGUE METHOD

CROSS-REFERENCE TO RELATED APPLICATIONS

This application is based upon and claims the benefit of priority from prior European Patent Application number 21382443.6 filed on 12 May 2021, the entire contents of which are incorporated herein by reference.

FIELD

The present disclosure relates to a dialogue system and a dialogue method.

BACKGROUND

Dialogue systems, or conversational user interfaces, for example chatbots or voice-based agents, are used in many applications, such as voice or chat-based search, recommendation, and booking. For example, a dialogue system for restaurant reservation should help a user to book a reservation at the restaurant, such that when a user asks "Can I make a booking for 4 people on Saturday", the dialogue system might respond with "What time would you like the booking?".

The user behaviour in conversations with dialogue systems can be non-linear. There is a continuing need to improve the functioning and efficiency of such dialogue systems, particularly for handling non-linear user behaviour.

BRIEF DESCRIPTION OF FIGURES

Systems and methods in accordance with non-limiting embodiments will now be described with reference to the accompanying figures in which:

FIG. 2 (b) shows a schematic illustration of dialogue information used in the dialogue policy module of FIG. 2 (a);

FIG. 3 (b) shows an illustration of example functions of a state;

FIG. 8 (b) shows a legend of the components used in the policy module of FIG. 8 (a);

DETAILED DESCRIPTION

Figure 1:
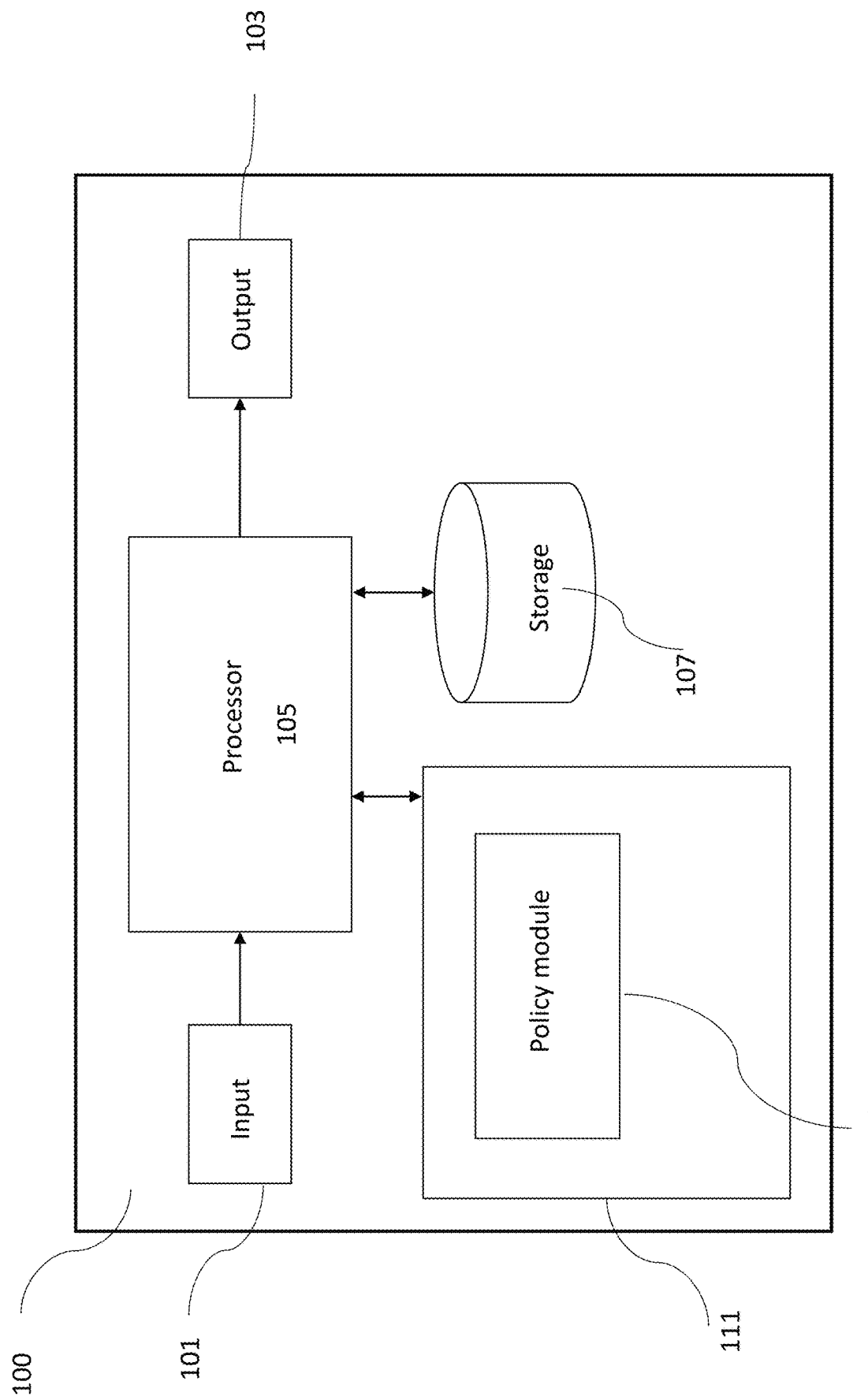
FIG. 1 shows a schematic illustration of a dialogue system in accordance with an embodiment.

According to one aspect, there is provided a dialogue system comprising:
an input for obtaining an input signal relating to speech or text input provided by a user;
an output for outputting speech or text information specified by a determined dialogue act; and
a processor configured to:
  determine dialogue information from the input signal;
  determine the dialogue act based on the determined dialogue information, wherein determining the dialogue act comprises:
    selecting a next state from a plurality of states, wherein each of the plurality of states comprises information specifying a dialogue act and transition information specifying a transition to another state, the transitions defining one or more dialogue pathways, wherein selecting the next state comprises selecting a state which is specified by the transition information in a current state or selecting a state which is specified by a rule in a first set of one or more rules.

In an embodiment, determining the dialogue act uses a state machine comprising the plurality of states, wherein the current state represents a current point in the dialogue, the processor further configured to perform a transition of the state machine from the current state to the next state.

In an embodiment, the state machine further comprises an additional state which does not comprise information specifying a dialogue act, wherein the additional state comprises information specifying a function.

In an embodiment, the first set comprises a first rule specifying the additional state, the processor further configured to:
responsive to determining that a first condition specified by the first rule is met:
  perform a transition of the state machine from the current state to the additional state;
  perform the function specified in the additional state;
  perform a transition of the state machine from the additional state to the next state.

In an embodiment, the function specified in the additional state comprises exchanging information with a database.

In an embodiment, determining the dialogue act comprises:
performing a transition of the state machine from the current state to an intermediate state;
performing a transition of the state machine from the intermediate state to the next state;
wherein the dialogue act is determined by combining the dialogue act specified in the intermediate state and the dialogue act specified in the next state.

In an embodiment, determining the dialogue act comprises:
responsive to determining that a first condition specified by a first rule in the first set is met:
  updating the dialogue information as specified by the first rule; or
  selecting a state which is specified by the first rule as the next state.

In an embodiment, selecting the next state from a plurality of states further comprises:

performing a transition from the current state to an intermediate state comprising information specifying a first dialogue act;

determining whether the dialogue information comprises information associated with the first dialogue act;

responsive to determining that the dialogue information comprises information associated with the first dialogue act, selecting a state which is specified by the transition information in the intermediate state as the next state.

In an embodiment, if the dialogue information does not comprise information associated with the first dialogue act, the intermediate state is selected as the next state and the dialogue act specified in the intermediate state is selected.

In an embodiment, selecting the next state comprises:

determining whether one or more conditions specified in the first set of one or more rules are met and selecting the state based on the determination.

In an embodiment, selecting the next state comprises:

determining whether the current state is indicated as skipped in any of the first set of one or more rules;

responsive to determining that the current state is indicated as skipped in all of the first set of one or more rules, selecting the state which is specified by the transition information in the current state.

In an embodiment, the first set comprises a first rule specifying a first state, wherein selecting the next state comprises:

determining whether one or more conditions specified in the first set of one or more rules are met; and responsive to determining that a condition specified in the first rule is met, selecting the first state.

In an embodiment, each time an input signal is provided by the user, the next state is selected by:

determining whether the current state is indicated as skipped in any of the first set of one or more rules;

responsive to determining that the current state is not indicated as skipped in one or more of the first set of one or more rules, determining whether one or more conditions specified in the one or more rules are met and selecting the state based on the determination.

In an embodiment, the current state is part of a first dialogue pathway and the next state is part of a second dialogue pathway, and wherein the processor is further configured to perform a transition of the state machine from the next state back to a state in the first dialogue pathway after performing the dialogue act specified by the next state.

In an embodiment, the state in the first dialogue pathway is a root state.

According to another aspect, there is provided a computer implemented method, comprising:

obtaining, by way of an input, an input signal relating to speech or text input provided by a user;

determining dialogue information from the input signal;

determining a dialogue act based on the determined dialogue information; and outputting, by way of the output, speech or text information specified by the determined dialogue act, wherein determining the dialogue act comprises:

selecting a next state from a plurality of states, wherein each of the plurality of states comprises information specifying a dialogue act and transition information specifying a transition to another state, the transitions defining one or more dialogue pathways, wherein selecting the next state comprises selecting a state which is specified by the transition information in a current state or selecting a state which is specified by a rule in a first set of one or more rules.

According to another aspect, there is provided a non-transitory computer readable storage medium comprising computer readable code configured to cause a computer to perform the following:

obtaining, by way of an input, an input signal relating to speech or text input provided by a user;

determining dialogue information from the input signal;

determining a dialogue act based on the determined dialogue information; and outputting, by way of the output, speech or text information specified by the determined dialogue act, wherein determining the dialogue act comprises:

selecting a next state from a plurality of states, wherein each of the plurality of states comprises information specifying a dialogue act and transition information specifying a transition to another state, the transitions defining one or more dialogue pathways, wherein selecting the next state comprises selecting a state which is specified by the transition information in a current state or selecting a state which is specified by a rule in a first set of one or more rules.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium. According to another aspect, there is provided a carrier medium comprising computer readable code configured to cause a computer to perform any of the above described methods.

Dialogue systems, or conversational user interfaces, for example chatbots or voice-based agents, are used in many applications, such as voice or chat-based search, recommendation, and booking. For example, a dialogue system for restaurant reservation should help a user to book a reservation at the restaurant, such that when a user asks "Can I make a booking for 4 people on Saturday", the dialogue system might respond with "What time would you like the booking?".

Dialogue systems may use a control flow based policy to determine a system response to a user input utterance. A control flow policy may be based on a state machine, comprising a plurality of states representing different points in a dialogue, where different states identify different system responses. The state machine transitions between the states based on the user inputs, and determines the system output based on the current state. The state machine includes a limited number of pre-defined transitions that represent the expected dialogue pathway(s).

However, the user behaviour in conversations with such dialogue systems can be non-linear. In order to allow such non-linear conversations, control flow policy models could explicitly specify all possible transitions, including the non-linear transitions, at every possible point in the dialogue. However, such a model may use a large amount of computational resource. Furthermore, for more complex dialogues, it may not be possible to include all the possible transitions.

The disclosed method provides an improvement to computer functionality by allowing computer performance of a function not previously performed by a computer. Specifically, the disclosed system provides for the retrieval of suitable responses without pre-specifying all possible dialogue pathways. The method achieves this by combining a control flow approach with a data flow approach. The method uses a plurality of states, each of the plurality of states comprising information specifying a dialogue act and transition information specifying a transition to another state. The transitions define one or more dialogue pathways, in a control flow approach. However, the method also uses a set of global rules, in a data flow approach. The global rules are assessed after every user input, by determining whether the conditions specified in the global rules are met. A transition from the current state to the next state is then made based on this determination. For example, where a condition is met for a global rule which specifies a transition to a particular state, this particular state is selected as the next state. If no such conditions are met, the next state is selected along the pre-defined dialogue pathway, in other words the state which is specified by the transition information in the current state. This combined approach enables the policy module to efficiently model non-linear conversations, for example with user back-referrals being handled by the global rules.

Furthermore, the disclosed system addresses a technical problem tied to computer technology and arising in the realm of computer networks, namely the technical problem of resource utilization. The disclosed system solves this technical problem by combining a state machine approach with a global rule approach. The mixed approach enables multiple conversational scenarios to be handled without requiring pre-specification of additional dialogue pathways or states. Thus, the system does not store transition information specifying all possible dialogue pathways, resulting in better use of storage capacity. Rather, the system applies a set of global rules in order to handle repetitions, back-referrals, and non-scripted user behaviour.

This mixed approach, including a state machines with global rules, is also referred to here as a mixed-initiative design. The approach combines control-flow design (akin to state machines) and data-flow design (based on global rules). The mixed initiative design enables "local" dialogue flows within "global" flows. This approach also enables the deployment of predefined dialogue flows as reusable components, with no or minimal adaptations.

It is noted that a pure dataflow design, in which a set of global rules is applied at each dialogue turn, may also use a large amount of computational resource for more complex use cases. A pure dataflow design can further limit visualisation, control, and interpretation of the dialogue policy.

FIG. 1 is a schematic illustration of a dialogue system 100 in accordance with an embodiment. The system comprises an input 101, a processor 105, a working memory 111, an output 103, and storage 107. The system 100 may be a mobile device such as a laptop, tablet computer, smartwatch, or mobile phone for example. Alternatively, the system 100 may be a computing system, for example an end-user system that receives inputs from a user (e.g. via a keyboard, screen or microphone) and provides output (e.g. via a screen or speaker), or a server that receives input and provides output over a network.

The processor 105 is coupled to the storage 107 and accesses the working memory 111. The processor 105 may comprise logic circuitry that responds to and processes the instructions in code stored in the working memory 111. In particular, when executed, a program 109 is represented as a software product stored in the working memory 111. Execution of the program 109 by the processor 105 will cause embodiments as described herein to be implemented. The program 109 may comprise the policy module 40 described in relation to the figures below for example. The program 109 may further comprise other components of a dialogue system as described herein, for example an automatic speech recognition module.

The processor 105 also accesses the input module 101 and the output module 103. The input and output modules or interfaces 101, 103 may be a single component or may be divided into a separate input interface 101 and a separate output interface 103. The input module 101 receives a query through an input, which may be a receiver for receiving data from an external storage medium or a network, a microphone, screen or a keyboard for example. The output module 103 provides the response generated by the processor 105 to an output such as a speaker or screen, or a transmitter for transmitting data to an external storage medium or a network for example.

The input is in the form of text or audio, and the output is provided to the user in the form of text or audio. It should be noted that the system can be configured to work with one or both of text and audio signals. Working with text interfaces (and not only audio) can allow, for example, hearing impaired and mute people to also use the system. If the input is in the form of audio, an automatic speech recognition model may be included to convert the input audio to text. Any type of speech recognition process may be used, for example, a trained speech recognition algorithm based on a neural network or Hidden Markov Model may be used. If the output is to be in the form of audio, a text to speech model is included. Any type of text to speech generation model may be used.

The system may further comprise means of communication with third-party services. For example, the system may be configured to communicate with a restaurant system when attempting to finalise a restaurant booking process (to check availability for a particular date, time, and number of people for example). The communication means may comprise a connection to a communication network for example.

The processor 105 is also configured to communicate with the non-volatile storage 107. The storage 107 may contain data that is used by the program 109 when executed by the processor 105. As illustrated, the storage 107 is local memory that is contained in the device. Alternatively however, the storage 107 may be wholly or partly located remotely, for example, using cloud based memory that can be accessed remotely via a communication network (such as the Internet). The program 109 is stored in the storage 107. The program 109 is placed in working memory when executed.

As illustrated, the system 100 comprises a single processor. However, the policy module 109 may be executed across multiple processing components, which may be located remotely, for example, using cloud based processing. For example, the system 100 may comprise at least one graphical processing unit (GPU) and a general central processing unit (CPU), wherein various operations described in relation to the methods below are implemented by the GPU, and other operations are implemented by the CPU. For example, matrix operations or vector operations are performed by a GPU.

Similarly, the system 100 may be located in a common system with hardware such as a microphone, keyboard and/or speaker for inputting and outputting signals. Alternatively, the system 100 may be a remote system, which receives data regarding the input signal transmitted from another unit, and transmits data regarding the output signal to the same or a different unit. For example, the system may be implemented on a cloud computing system, which receives and transmits data. The system may be implemented on a server device, which receives data from and transmits data to a user device such as a phone.

Usual procedures for the loading of software into memory and the storage of data in the storage unit 107 apply. The program 109 can be embedded in original equipment, or can be provided, as a whole or in part, after manufacture. For instance, the program 109 can be introduced, as a whole, as a computer program product, which may be in the form of a download, or can be introduced via a computer program storage medium, such as an optical disk. Alternatively, modifications to existing dialogue manager software can be made by an update, or plug-in, to provide features of the above described embodiment.

While it will be appreciated that the below embodiments are applicable to any computing system, the example computing system illustrated in FIG. 1 provides means capable of putting an embodiment, as described herein, into effect. As is described in more detail in relation to FIG. 10 below, in use, the system 100 receives, by way of input 101, an input signal relating to speech or text input provided by a user. The program 109, executed on processor 105, determines dialogue information from the input signal and determines a dialogue act based on the determined dialogue information, in the manner that will be described with reference to the following figures. The system 100 outputs, by way of the output 103, speech or text information specified by the determined dialogue act. The dialogue act is determined using a policy module 40 (also referred to as a dialogue management module), which acts to determine a system action based on the dialogue information. The dialogue policy module controls and decides the next system action based on the most recent user utterance and previous dialogue history.

Figure 2A:
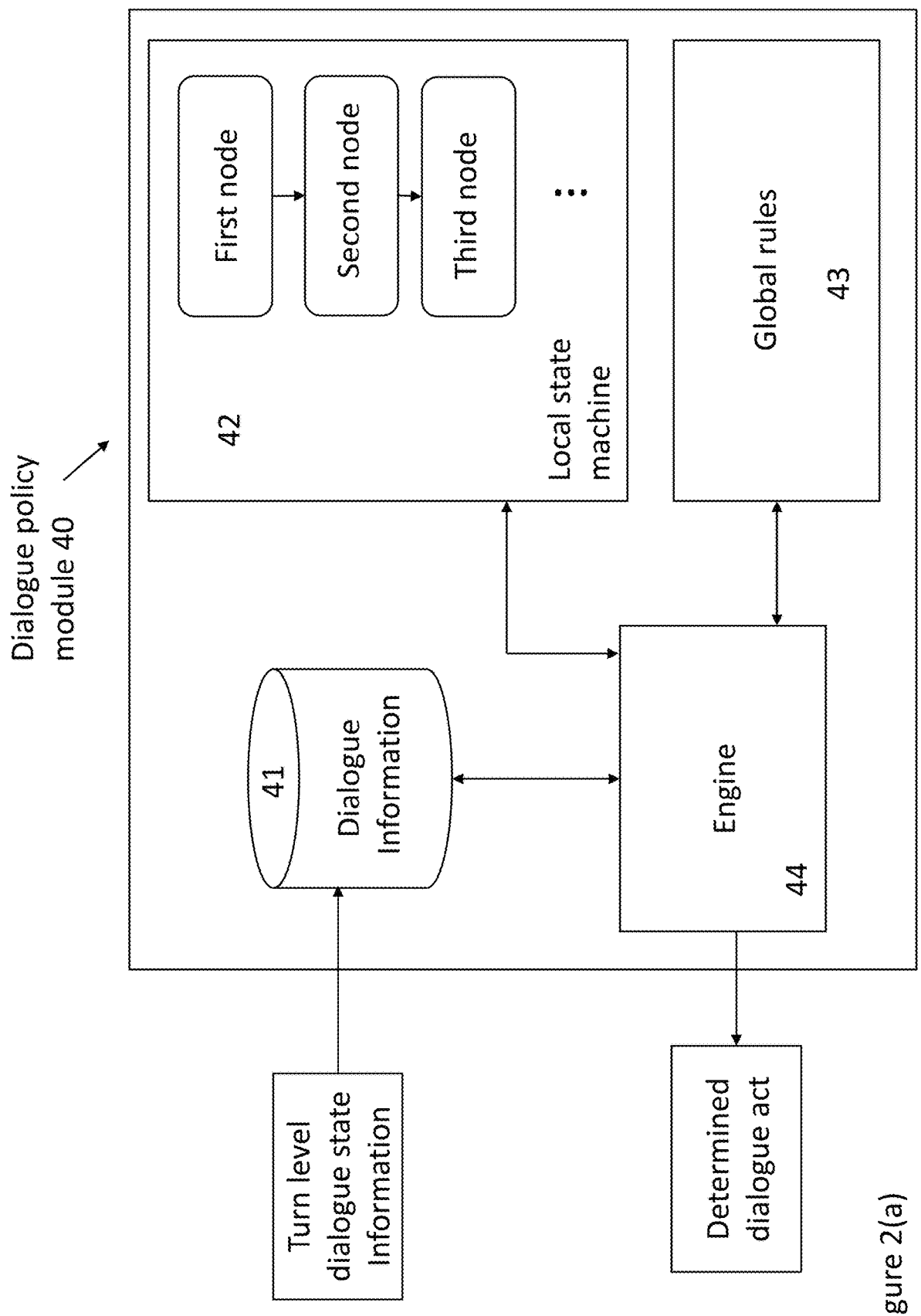
FIG. 2 (a) shows a schematic illustration of a dialogue policy module which is used in a method in accordance with an embodiment.
Figure 2B:
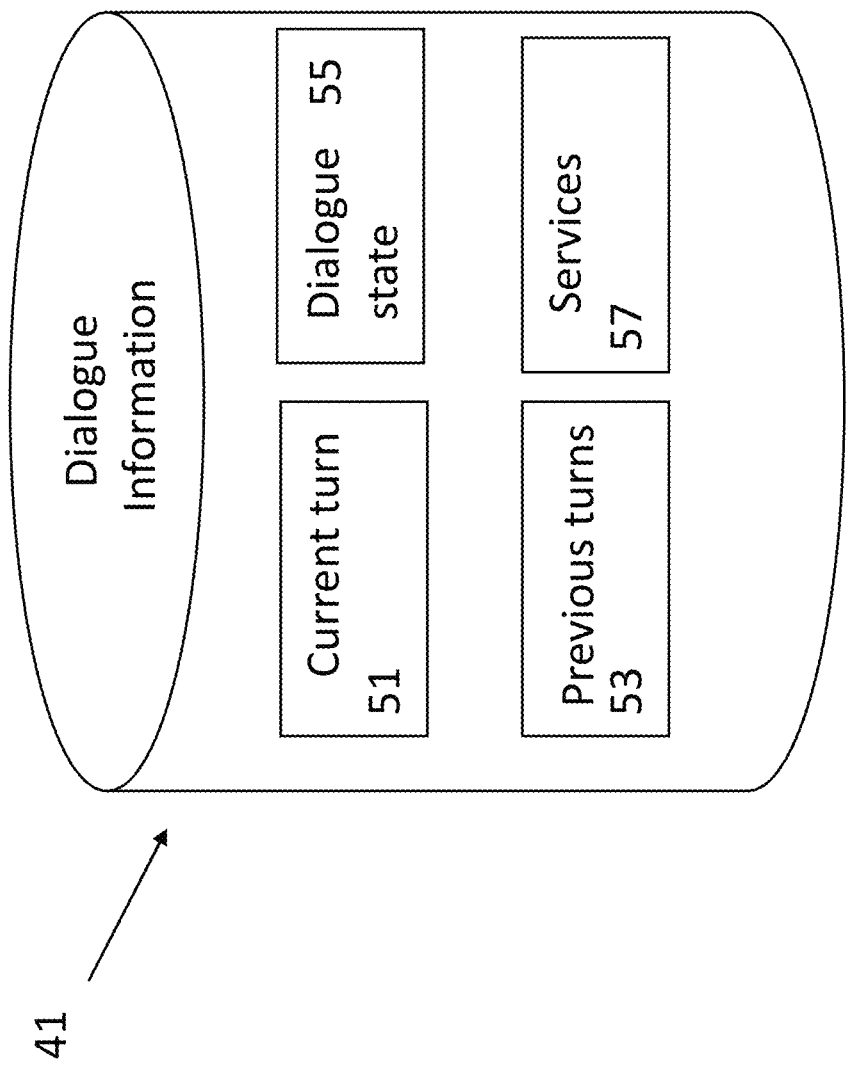

FIG. 2 (a) shows a schematic illustration of a dialogue policy module 40 which may be used in a dialogue method according to an embodiment. The policy module 40 can be used to implement dialogue management for voice-based or text-based task-oriented dialogue systems for example. As is described in more detail in relation to FIG. 10 below, in such a dialogue system, an input user utterance is passed through an Automatic Speech Recognition (ASR) speech-to-text module, and then through a Natural Language Understanding (NLU) module. The NLU module performs intent detection and {slot, value} extraction. For each input user utterance, any intents and/or slot values are extracted. This information is referred to herein as the turn level dialogue state information, and comprises one or more slot values and/or one or more intents. How the turn level dialogue state information may be extracted by an NLU module is described in more detail in relation to FIG. 10 below.

The purpose of the dialogue policy module 40 is then to integrate and act upon this new information, further conditioned on the stored dialogue history (also referred to herein as the "turns information"). The output of the dialogue policy module 40 is a policy decision, also referred to herein as a dialogue act. This corresponds to a system response in natural language.

The dialogue policy module 40 comprises a state machine 42, which is also referred to as a policy state machine. The state machine 42 comprises a plurality of stored states. Throughout this specification, the states are also referred to as nodes. The state machine 42 comprises stored information defining each of the states. For each state other than an end state, this information comprises an identifier of the state and transition information. The transition information, also referred to herein as a transition function, identifies another state from the plurality of states. At least some of the states also comprise information specifying a dialogue act, as will be explained in further detail below. The states, or nodes, correspond to points in a dialogue and are the basic units of the policy state machine 43. They are used to mark where the dialogue is during conversation and how to act as a result.

For example, a start node corresponds to the start of a dialogue, an end node to the end of a dialogue, and various other nodes in between are defined corresponding to dialogue acts that the system may be expected to make during the dialogue, for example a "greet" node, an "ask help" node, and an "FAQ" node. Further nodes that correspond to functions other than dialogue acts may also be included. A node may be defined for each expected exchange between the dialogue system and the external environment, where the external environment is the user, an API backend, or a $3^{rd}$ party service. Some nodes may not correspond to a dialogue act, for example when the node represents an exchange with an API backend.

A change from one state, or node, to another is referred to as a transition. Each node comprises information defining a specific transition (transition information) which identifies another node. Transitions performed based on this information are referred to here as local transitions. The transition information may identify two or more possible other nodes, with conditions that determine which of these should be selected. For example, the transition information may comprise a "transition( )" function that returns a "NodeBase" object, where the "NodeBase" object defines the next node in the state machine 42, based on a set of conditions. In some nodes, the "transition( )" function may return "None", and this indicates to return to a predefined default node.

The transition information defines one or more dialogue pathways, as will be seen in the examples below. Here, a simple example is described, in which a plurality of nodes are joined in a single pathway, so that a first node (start node) defines a transition to a second node, which defines a transition to a third node, and so on, until the end node. A dialogue pathway from the first node, to the second node, to the third node etc is defined. However, it will be appreciated that more complicated dialogue pathways can be defined, having multiple branches for example. Furthermore, multiple separate dialogue pathways may be defined, where some nodes belong to a first pathway and other nodes belong to a second pathway. The nodes and transition information are organized according to the intended use cases, based on the information expected from the user and the information it is expected the user might request, for example.

The state machine 42 can be represented by a graph. The states of the state machine 42 are represented by nodes in the graph and the transitions between states are represented by solid arrows joining the nodes. A policy graph is a set of one or more such graphs that may or may not connect to each other, representing the state machine 42. The graphs can be used to model either step-by-step main dialogue flows or pathways, or a set of small subroutines, for example multi-turn FAQs. The main pathway comprises a starting point "Start node" and the conversation ends at "End node". This graph-based representation allows simple and interpretable dialogue design. The state machine 42 may further comprise a default node that defines a default behaviour whenever the NLU module fails to detect a user intent or slot value information. The nodes of the graph are the core atomic units describing local behaviour, for example the GreetNode will welcome the user by simply saying "Hello".

In FIG. 2, the state machine 42 comprises a first node and some further nodes, including a second node and a third node. The first node represents a first point in the dialogue with the user, which may have an associated dialogue act. The second node represents a second point in the dialogue with the user, which again may have an associated dialogue act. The connection between the first node and the second node represents a local transition, which defines part of an expected dialogue pathway, or a direction that the conversation is expected to take. The transition between the first node and the second node is defined in the transition function, or transition information, of the first node. By two nodes being directly connected, it is meant that one of the nodes comprises a functionality that executes a transition to the other node. The transitions are connections between two nodes, that set a path the conversation is expected to take. The transitions may be based on certain conditions.

Figure 3:
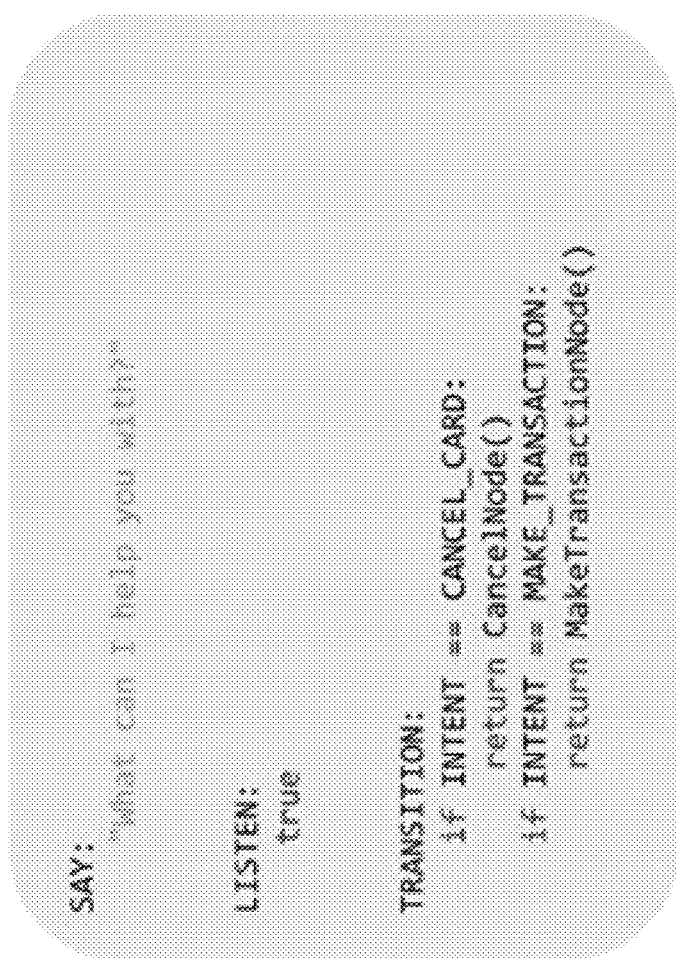
FIG. 3 (a) shows a schematic illustration of a state used in the dialogue policy module of FIG. 2 (a)
Figure 3:
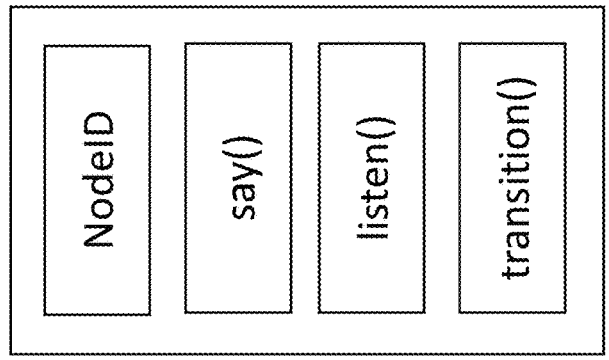

FIGS. 3(a) and 3(b) show a schematic illustration of an example node. The node comprises information identifying the node, the "NodeID". For example, for the first node this may be "First_node" or a name of the node, for example "Start_node". The node further comprises transition information. FIG. 3(b) illustrates the transition function of the node, which returns the node "CancelNode" as the next node if a condition "Intent==Cancel_card" is met, and returns the node "MakeTrasactionNode" as the next node if the condition "Intent==Make_transaction" is met. In order to determine the next node, the conditions are assessed against the stored dialogue information 41, to determine whether an intent "Cancel_card" or "Make_transaction" is stored. The "transition( )" function in this example thus comprises a set of logical 'IF' statements that define a transition to either "CancelNode( )" or a "MakeTransactionNode( )" based on the intent of the user. The "INTENT" is extracted by the NLU module from an utterance made by the user, and stored in the dialogue information 41, as will be described below.

As well as the information identifying the node and the transition information, a node may comprise further information defining one or more functions, such as a "say" function, a "listen" function, an "update" function or a "call" function. The node shown in FIG. 3(a) comprises information defining a "say" function. The say function defines what the system should say at the node. A "say" function comprises information specifying a dialogue act, and therefore a node comprising a "say" function is a node comprising information specifying a dialogue act.

In particular, a "say( )" function comprises an utterance, in other words the say( ) function returns an utterance object. An utterance is a function providing a predefined template of what should be output by the system at a given node. The set of pre-defined utterances are used to generate the system dialogue acts.

A dialogue act comprises an utterance and an argument of the utterance. The argument may be empty, for example where the utterance is "greeting". In this case the dialogue act is equal to the underlying utterance. The argument may be a slot value for example. An example dialogue act is "confirm_party_size(=4)", where the utterance "confirm_party_size slot (=value)" is combined with the argument, which is the current value for the party_size slot (=4), to generate the dialogue act. Another example dialogue act is "request_time_slot", where the utterance is "request_time_slot" and the argument is empty.

A system response (also referred to as a system prompt) is constructed by combining all dialogue acts accumulated during a turn. The system prompt is the final text to be provided by the system to the user. In other words, the system prompt is a surface realisation of the selected utterance, assembled to the dialogue act by additionally providing any arguments.

During a dialogue turn, a dialogue act is constructed from an utterance specified in the node transitioned to in the turn, together with any argument required by the utterance (which may be taken from the current dialogue information). A system prompt, which is the text which corresponds to the dialogue act, is output to the user.

Other node functions include a "call( ) function", an update function and a "listen( )" function. The listen and call functions will be described in more detail below. An update function updates some information in the dialogue information 41. A node may therefore define a sequence of one or more functions the system takes after data is received from the external environment (for example, data from the user or an API backend). The sequence of steps may comprise saving data in the dialogue state information 41, fetching data from the dialogue state information 41, processing data, writing metrics, or issuing API calls for example.

The policy module 40 further comprises an engine 44. The engine 44 comprises a set of computer instructions embodying a method which performs transitions between the nodes based on the transition information defined in the nodes themselves and the global rules 43. The engine 44 is described in more detail in relation to FIGS. 5 and 6 below.

The policy module 40 further comprises a set of one or more global rules 43. A global rule has the form "if X, then Y", where the condition (if X) is assessed based on the dialogue information 41 for example, and the action (then Y) may be a transition to a state in the state machine 42 for example. As is explained in further detail in relation to FIGS. 5 and 6 below, a global rule can be triggered at any point in the conversation, in other words from any state, as long as the condition in the global rule is met. Assessing a global rule comprises determining, based on the condition defined in the global rule, whether the global rule should be triggered or not; and if it is determined that the global rule should trigger, perform an action defined by the global rule. Where a global rule comprises "IF" and "THEN" logical statements, the IF and THEN statements define the condition to be met and action to be performed.

A global rule may comprise three functions:

A "condition( )" function that returns a boolean flag specifying whether the global rule should be triggered or not—the "condition( )" function comprises one or more logical statements that are assessed based on the stored dialogue information 41. For example, the condition( ) function can take any of the following parameters as input: dialogue state, dialogue history, the domain object of the system, the transcribed text and n-best list returned from an ASR module, or the NLU output of the current turn. An example of a condition is IF "time" slot value changed, RETURN "true"

An "action( )" function that defines what the system does if the "condition( )" is met—for example, the "action( )" function returns a node to transition to, or updates a variable in the stored dialogue information 41;

Optionally a "skip_nodes" routine that returns a list of nodes in the policy state machine 42 where the global rule should not be triggered. For example, when it is expected to collect the spelling of a name or address, all global rules are skipped to provide a higher chance to get the spelling correct. Thus a node "spelling" (such as node 1015 of FIG. 7, for example) may be included in the "skip_nodes" list of all global rules. This means that the global rules are disabled at this node, and their condition( ) function is not called and assessed. Any type of node may be included in the list. Start and stop nodes may be included in the skip list for all global rules for example.

A global rule may be represented by an object referred to as "GlobalRule". The global rules 43 are stored in the policy module 40 as a list of the "GlobalRule" objects. This defines the global transition logic and is also referred to as "global_rules". The global rules are stored with information identifying a pre-defined order of execution, in other words an order in which the global rules 43 are assessed. For example, global rules comprising an action which updates a variable in the dialogue information 41 are assessed first.

The dialogue policy module 40 further comprises stored dialogue information 41. The dialogue information 41 is shown in more detail in FIG. 2(*b*). The dialogue information 41 may also be referred to here as the dialogue context. The dialogue information 41 comprises current turn information 51, previous turn information 53, dialogue state information 55, and services information 57. The dialogue information 41 is accessible globally throughout the policy module 40. In other words, the content of the dialogue information 41 is visible at all the nodes. The dialogue information 41 is a common storage of data, which acts as a globally-accessible object by all policy module components, since it is passed everywhere, and stores information used by the other components of the policy module 40.

The current turn information 51 comprises a "Turn" object. The "Turn" object comprises information generated in the current dialogue turn, for example the user input text, the system output text, a sequence of nodes and transitions that happened in that turn, and a list of utterances that has been accumulated through the transitions. A "turn" denotes a set of transitions and gathered system responses between two consecutive user inputs. The dialogue policy module 40 also receives turn level dialogue state information from an NLU module, each dialogue turn. The turn level dialogue state information comprises any slot values or intents extracted by the NLU module from the most recent user input utterance. This information is also stored in the current turn information 51.

The previous turn information 53 is also referred to as the dialogue history. This comprises a list of "turn" objects that form a complete history of the conversation. The list may be referred to as "previous_turns" for example. By storing this information, all the nodes, utterances and the NLU have access to the complete history of previous turns. This serves as the "memory" of the conversation. The current turn information 51 and previous turn information 53 can also be referred to collectively as "turns information" or just "turns".

The dialogue state information 55 comprises a key-value dictionary that stores data used for executing the policy. As mentioned above, turn level dialogue state information is stored in the current turn information 51, and comprises any slot values or intents extracted by the NLU module from the most recent user input utterance. The slots correspond to information or items the system would ask for during the course of the entire conversation. A pre-defined set of slots is also stored in the dialogue state information 55—these are the "keys". There may be one or more possible values associated with each slot. The dialogue state information 55 is then updated based on the turn level dialogue state information in the current turn information 51. The dialogue state information 55 comprises a set of information the system would ask for during the course of the entire conversation (slots), along with the maintained set of values associated with each item. It is possible to also specify the type of each "slot" in the dialogue state information 55.

The dialogue state information 55 can be updated by performance of an action of a global rule for example. For example, a set of the global rules comprise action functions which update variables in the dialogue state information 55. This set of global rules may be assessed prior to the other global rules. The conditions for such global rules may depend on the turn level dialogue state information returned by the NLU module (stored in the current turn information 51) and the current dialogue state information 55 for example. For example, a global rule may comprise a condition "IF "time" slot value in the current turn information 51 is different to "time" slot value in the current dialogue state information 55, RETURN 'true'". The action of this rule may then comprise an update to the "time" slot value in the current dialogue state information 55. The update to the dialogue state information 55 may be assessed based on further conditions, such as some relative weight of the current turn information 51, and the current dialogue state information 55 for example.

The dialogue state information 55 can also be updated by performance of a function in a node for example. For example, as will be described in more detail in the examples below, a "date, time, party_size node" comprises a say function requesting this information from the user. A listen function is then performed, the next user input is received and processed by the NLU module, and the turn level state information stored in the current turn information 51 is updated. The method described in relation to FIG. 5 below is then performed, starting from the start node, and skipping through the node transitions through the pre-conditions. When the "date, time, party_size node" is reached again, the say function is not performed as a result of the pre-condition.

However, the "date, time, party_size node" also comprises a function which updates variables in the dialogue state information 55. For example, the "date, time, party_size node" comprises a function "IF "time" slot value in the current turn information 51 is different to "time" slot value in the current dialogue state information 55, THEN update time" slot value in the current dialogue state information 55". The update to the dialogue state information 55 may be assessed based on further conditions, such as some relative weight of the current turn information 51, and the current dialogue state information 55 for example.

As will be described in more detail in relation to FIG. 10 below, for each dialogue turn, a transcription of the user input is received from the ASR. The NLU module is triggered to run all predictions for slot-value pairs and intent in parallel and the result is then stored in the Turn object in the current turn information 51. Items in the dialogue state information 55 are updated by the policy module 40, and in particular by the global rules 43 or the node functions.

The services information 57 comprises a list of services used by the policy module 40. Services are clients of API services of third parties, for example. API calls and services relate to 3rd-party (knowledge) databases or services, and are used to obtain information required to perform the task. For example, an API call may be made to confirm whether there is availability at the time requested by the client. The received availability information may be stored in the turns object in the current turn information 51.

Optionally, as the dialogue progresses, the current node is also tracked by updating a dedicated variable in the dialogue information 41. Alternatively, a flag indicating that a node is currently active or not is associated with each node.

Referring to FIG. 2, in use, the engine 44 implements a method which performs transitions between the nodes in the state machine 42 based on the transition information defined in the nodes themselves and the global rules 43. The global rules 43 comprise conditions based on the dialogue information 41. The transitions are governed by a set of logical rules, the global rules 43, and a set of local transitions specified by each node, and the engine 44. The approach combines a control-flow design, using the state machine 42, with a data-flow design, using the global rules 43. This mixed-initiative design enables "local" conversational flows within "global" flows. The global rules 43 allow the system to handle task-oriented conversations with non-linear structures, that is, with repetitions, back-referrals, or non-scripted behaviours. The state machine 42 allows predefined conversational flows to be deployed as reusable components, which can be used across different tasks and domains with only a small amount of adaptation and adjustment. The mixed-initiative dialogue policy module 40 design enables modelling of non-linear conversational flows.

A dialogue between the system and a user comprises a plurality of turns. A turn is defined as being between two consecutive user inputs, where the turn starts after a user input and ends before the next user input. For each turn, a turn object is stored in the current turn information 51 as described above. As will be described in relation to FIGS. 5 and 6 below, at the start of the turn, the engine 44 assesses the global rules. Global rules are assessed according to their priorities in the queue. In other words, there is a pre-defined order in which the global rules are assessed. For example, global rules comprising an action which updates the dialogue information 41 are assessed before global rules comprising an action which defines a transition to a node.

If a condition is met for a global rule for which the action is a transition to a node, the engine 44 executes a transition to the resulting node. This is recorded as an event in the current turn information 51. If no such global rules trigger, the transition function of the current node is executed. This is again recorded as an event in the current turn information 51. If the node (reached either through a global or local transition) is passive, the node functions are performed, any utterance is accumulated in the current turn information 51 and the transition function of the node executed. If the node is active, the system response is constructed and output, and the system waits for the new user input. Responses are constructed by putting together the one or more utterances accumulated from the nodes transitioned through during the turn, for example by concatenating them, together with any arguments. Turns end at a node with a listen function, which is also referred to as an "active node". These are the points in the conversation where it is expected that the user gives a new input. Passive nodes do not have a listen function.

As explained above, the system response is constructed from one or more utterances and their arguments. An utterance is a function providing what should be said at a given node. The node comprises a say function identifying the utterance. The system response is constructed by concatenating all utterances and arguments accumulated during the turn—in other words the dialogue acts—and converting to a system prompt, which is the output text. An utterance represents the atomic meaning that is independent of its actual surface forms, while the system prompt is the surface form itself. For example, an utterance can be GREETING, and the corresponding system prompts can be 'Hello', 'Hi', or 'Bonjour'.

An utterance may be defined as a key value mapping, where the "key" is the category of what the system should output, and the "key value" is the template, which when filled in with any argument gives the system prompt. An example of a key value mapping is "BYE: Goodbye. We'll look forward to seeing you soon.", where "BYE" is the key and "Goodbye. We'll look forward to seeing you soon." is the "key value". In this case, since there are no arguments, the dialogue act is just the same as the utterance (BYE: Goodbye. We'll look forward to seeing you soon.), and the system prompt (or output text) is just the template included in the utterance.

More complex utterances may comprise logical statements. An example is the following:

```
INFORM_APPOINTMENT_AVAILABLE:
    text:
        default: >-
            Great, we have an availability {slots[date]} at
                {slots[time]}. Shall we get that booked in for
                you?
        count>0: >-
            Ok, {slots[date]} at {slots[time]}. Should I go
                ahead and make the appointment for you?
    slots:
        date:
            key: date
            fmt: relative_day_name
        time:
```

In the above example of an utterance, the key is "INFORM_APPOINTMENT_AVAILABLE", the utterance arguments are the time slot value and the date slot value, and the "key value" is "Great, we have an availability {slots[date]} at {slots[time]}. Shall we get that booked in for you?" and "Ok, {slots[date]} at {slots[time]}. Should I go ahead and make the appointment for you?". A dialogue act is formed by combining the utterance with the values of date and time currently stored in the dialogue state information 55. The system prompt is then either "Great, we have an availability on 1 Jan. 2021 at 1500. Shall we get that booked in for you?" or "Ok, 1 Jan. 2021 at 1500. Should I go ahead and make the appointment for you?" The logic alternates the template between a "default" and a "count>0" template, where "count>0" is chosen when the system enters the node comprising the function "say(INFORM_APPOINTMENT_AVAILABLE)" more than once; otherwise, "default" is picked. The count can be determined from the previous turns information 53. Inside the templates, {slots[date]} takes the date slot value stored in the dialogue state information 55. A formatting function "relative_day_name" is applied inside the utterance to convert the date slot value to a human-readable format. For some slot values such formatting is not used, such as for the "time" slot.

Utterances may also be used to configure more complex system behaviour, as in the below example.

```
REQUEST_POSTCODE:
    ask:
        text:
            default: What is your postcode?
            repeat>0: Can you repeat your postcode?
            repeat>1: Can you repeat your postcode again?
        validate_fail:
            text: >-
                I am sorry but {slots[postcode]} is not in a
                correct format. Let's try again. What is your
                postcode?
        slots:
            postcode:
                key: postcode
```

```
confirm:
    text: I understood {slots[postcode]}. Is that right?
    slots:
        postcode:
            key: postcode
```

In the above, the utterance key is "REQUEST_POST-CODE", the argument is the postcode slot value, and the key values are "What is your postcode?", "Can you repeat your postcode?", "Can you repeat your postcode again?", "I am sorry but {slots[postcode]} is not in a correct format. Let's try again. What is your postcode?" and "I understood {slots[postcode]}. Is that right?". A dialogue act comprises the utterance "REQUEST_POSTCODE" defined above, together with the postcode slot value. The system prompt (output text) corresponds to the relevant template in the utterance "REQUEST_POSTCODE" of the dialogue act, together with the postcode slot value in the dialogue act.

In the example of FIG. 3(b), the "say( )" function causes the system to output "What can I help you with?". The "LISTEN" function is set as true. The node shown in FIG. 3(b) is therefore an example of an "active node". An active node is a node configured to listen for an input from a user, in other words a node having a listen function. An active node causes the system to stop and wait for a user input. An example of such a node may be an "AskHelpNode", which comprises a say function "How can I help?" and then a listen function, causing the system to wait for a users answer to determine next steps. Nodes that do not comprise a listen function are referred to as passive nodes. For example, a passive node may perform call functions such as an internal check or an API call. For example, a passive node does not provide a reply to a user input. An example of a passive node is a GreetNode.

A StopNode is the end node of the policy state machine 42. Once a StopNode is reached, the conversation ends and no further system responses will be produced. A natural way of transitioning to StopNode is after a FinalNode, when the users query has been dealt with, but it can also happen in the middle of conversation e.g. when there is no user input. A StopNode does not comprise any of the "say( )", "listen( )" or "transition( )" functions.

The nodes in the state machine 42 may also be categorised as being a ControlFlow node or a DataFlow node. Each node comprises information identifying the node type as ControlFlow or DataFlow.

A DataFlow node can be entered from the current node when the current node comprises a transition function that returns said DataFlow node. In this case, a local graph transition path is followed to arrive at said DataFlow node. An example is described in relation to FIG. 7 below, where node 1003 transitions to 1005 in a local transition. However, a DataFlow node can also be entered via a global rule. Each DataFlow node is tied to at least one variable from the dialogue information 41, through a global rule. In other words, for each DataFlow node, there exists a global rule in which the action is a transition to said DataFlow node, and the condition is based on a variable from the dialogue information 41. The condition may be that the variable has changed. Whenever a change of that specifically-tied variable occurs, this triggers the global rule, where the global rules 43 are assessed at the start of each dialogue turn. The triggering of the global rule results in a transition to said DataFlow node, regardless of the part of the graph the conversation is currently in, that is, irrespective of what the current node is. This type of transition is referred to as a global transition. A transition to a DataFlow node can therefore be either a global transition or a local transition.

A ControlFlow node can only be entered from the current node when the current node comprises a transition function that returns said ControlFlow node. The set of ControlFlow nodes thus represent a programming execution that executes transition functions step-by-step deterministically. A transition to a ControlFlow node is always a local transition.

ControlFlow nodes may be driven by an immediate signal provided by the environment, for example, a piece of information collected in the ControlFlow node is directly used in the transition of that specific ControlFlow node. For example, the transition function in a check availability node is based on the availability information received in response to the call function performed at the check availability node. In contrast, DataFlow nodes may be driven by the information stored in the dialogue state information 55. For example, a DataFlow node may comprise a function that stores data in the dialogue state information 55, which is then used by other nodes.

A global transition is a transition made due to a global rule triggering. A transition that is made according to the stored transition function in a node is referred to as local transition. In other words, a transition that is made when the "transition ( )" function of a node returns the next node in the state machine is referred to as a local transition. The list of global rules executes first, skipping any global rules which specify the current node as a skip node, and if none of the global rules specifying a transition is triggered, the specific node transition is executed.

In a local transition, the next node is specified in the current node. FIG. 3(b) shows an example of a node specifying local transitions to "CancelNode( )" and "MakeTransactionNode( )". In a global transition, the next node is not restricted to one that is specified in the current node. Rather, the next node is specified in the global rule. The ability to make a global transition from any point in the dialogue pathway to a set of one or more DataFlow nodes allows for non-linear conversations. In other words, from a current node (which represents the current status of the conversation), a global transition may be made to a node that has not been predefined in the current node.

Global transitions can also be made from any point of conversation to a particular sub-routine or sub-flow. Pathways that are not directly connected to the start node can only be entered when a global transition is triggered. For instance, the user might ask about the address of a particular restaurant while the current status of the conversation is at the collection of date and time of booking. A global transition to an "Ask for address" DataFlow node can be made at this point, as explained in relation to FIG. 7 below. A node at the end of a subflow may comprise a local transition specifying a default node in the main flow, which may be the start node in the main flow for example.

Once a listen function has been executed, the dialogue turn ends. In the next dialogue turn, the method returns to the start node of the main conversational flow, or in an alternative implementation, the method returns to the node identified as the current node. The dialogue engine then proceeds to assess the global rules, and if no global transition is made, with the transitions defined by the main flow. Optionally, before executing a function of a node, a precondition is assessed to check whether there is a need to execute that function. The precondition may check information stored in the dialogue information 41 for example. This is referred to as checkpoint-based repositioning and is described further below in relation to FIGS. 5, 7, and 8. Checkpoint based repositioning enables the engine to skip one or more functions of the nodes. For example, after the end of a sub-flow execution, the dialogue automatically transitions from the start node back to the point in the main flow it previously came from, skipping the node functions.

Figure 5:
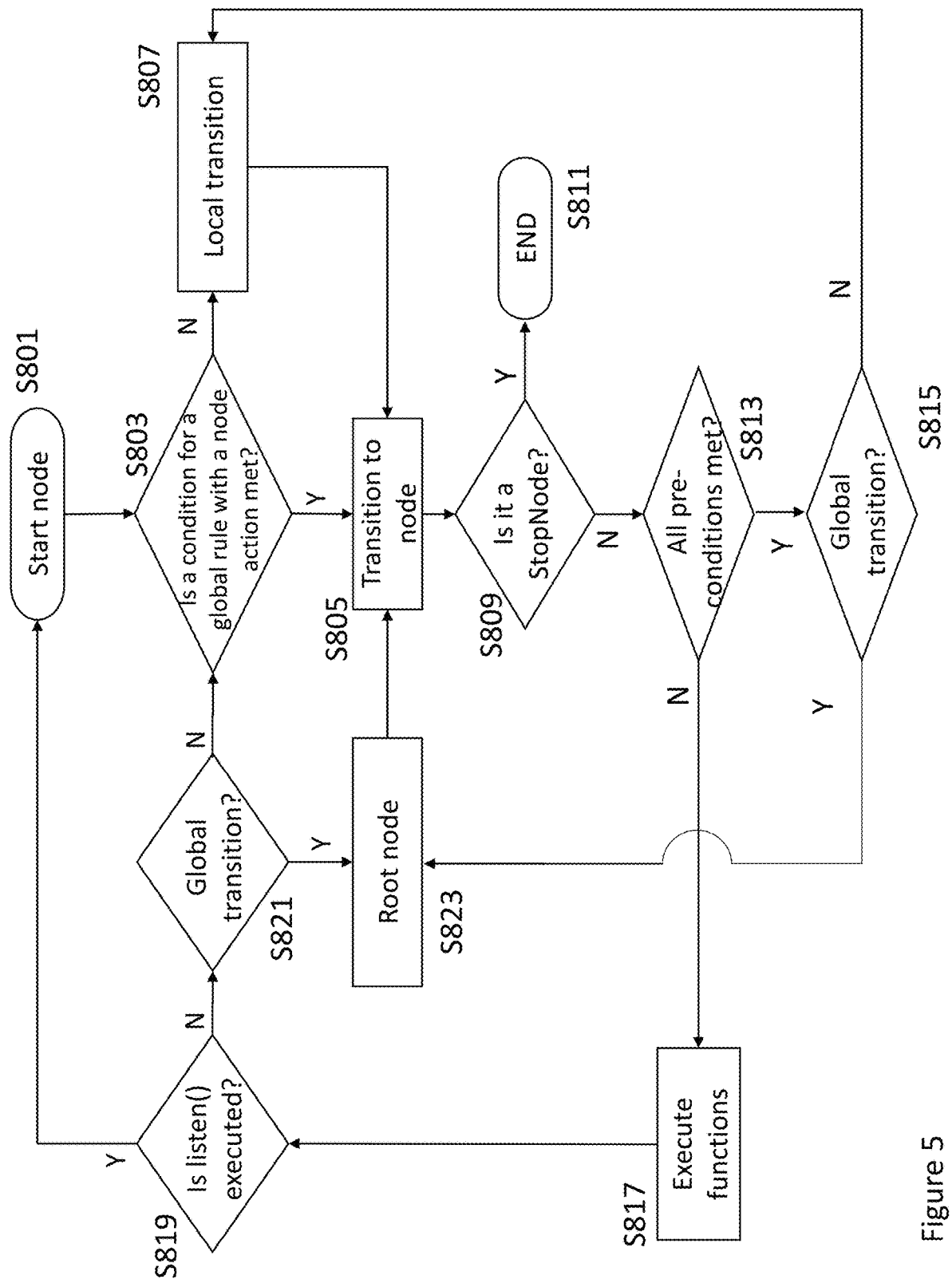
FIG. 5 shows a flowchart of a dialogue method according to an embodiment.

FIG. 5 shows a flowchart of a dialogue method according to an embodiment, in which a dialogue system interacts with a human user. The method may be performed on a dialogue system such as has been described in relation to FIG. 1. The method may be performed by the engine 44, described in relation to FIG. 2 above for example.

The method starts in S801. In the example shown in FIG. 5, the method starts at a "start node" for each dialogue turn. In an alternative example however, the method starts at a node which is designated as the current node in the dialogue information 41 for each dialogue turn. The policy execution follows the steps in FIG. 5 until a Stop Node is reached.

In step S803, the set of global rules 43 is assessed. Each global rule comprises at least one condition. The global rules are in the form "if X, then Y". The global rules are assessed to determine if any of the conditions (if X) are met. In this step, the list of global rules is scanned through and the conditions checked. If a condition is met, the action (then Y) of the rule is executed. The list of global rules is scanned down until an action returns a node or the list of global rules is exhausted. The conditions are checked against the dialogue information 41.

Optionally, the global rules 43 may be assessed only once per dialogue turn. For example, a variable may be stored in the current turn information 51 indicating whether the global rules 43 have been assessed. In S803, it may first be confirmed whether the global rules have been assessed for the dialogue turn, and if so, the method may skip directly to S807, without assessing the global rules 43 again.

Optionally, at S803, if the current node corresponds to a node returned by the "skip_nodes" routine of a global rule (described above), then that rule is not assessed. If none of the rules are assessed, the method proceeds to S807.

If a condition is met for a global rule in which the action is not a transition to a node, then the action is performed, and the scan through the list of global rules is continued. If a condition is met for a global rule in which the action is a transition to a node, the method transitions to the node specified by the global rule in S805.

If the list of global rules is exhausted without a transition, then the transition function specified in the current node is assessed in S807. The method transitions to the node specified by the transition function in S805. The engine executes the transition function to get to the next node in S807 and transits to it in S805.

The node transitioned to in S805 is referred to as the new current node.

In S809, it is assessed whether the new current node transitioned to in S805 is a stop node. If it is a stop node, then the conversation is ended in S811. Otherwise, the method proceeds to S813.

It is determined whether a precondition associated with the new current node is met in S813. If no pre-condition is met, then the functions of the new current node are performed in S817. This may include performing a say, listen, update and/or call function for example. If the precondition comprises two or more conditions, and some of the preconditions are met whilst some are not met, then some of the functions only are performed in S817—those for which the pre-conditions are not met. This is explained in further detail in relation to Example 1 below.

If all of the pre-conditions are met, then the functions of the new current node are not performed, and the method moves to S815. At S815 it is checked whether the previous transition was a global transition. If the previous transition was a global transition, the method moves to S823, which determines the root node for the current dialogue pathway. For a set of nodes directly connected together, the root node is the first node inside that flow. For the main dialogue pathway, the root node is the start node. For a sub-flow, the root node is the first node in the sub-flow. The method moves to S805, where it transitions to the root node identified in S823, and the steps are repeated from S805.

If the previous transition was not a global transition, the method instead returns to S807, and assesses the transition function of the new current node to determine the next node in the sequence. This node is transitioned to in S805, and the steps S807 to S813 repeat as before. When the pre-condition (s) are all met and the method instead returns to S807, the new current node may be referred to as being skipped (since its functions are not performed).

In S817, the engine executes the functions, for example the say and listen functions decide what to reply and whether to listen for the next turn or not. After the functions of the node are executed in S817, step S819 is performed.

At S819, it is checked whether a listen( ) function has been executed. For example, it is checked whether listen object with listen=True is returned. If a listen( ) function has been executed, the dialogue turn ends. As mentioned above, in this example the next dialogue turn starts again at the start node, at S801 of the method. In an alternative implementation however, the next dialogue turn starts at a node which is designated as the current node in the dialogue information 41. The methods steps repeat from S801 as described above for the next dialogue turn.

If no listen( ) function has been executed, the method moves to S821. At S821 it is checked whether the previous transition was a global transition. If the previous transition was not a global transition, the method returns to step S803. At step S803, the global rules 43 are assessed. As mentioned above, optionally, the global rules 43 may be assessed only once per dialogue turn, and if they have already been assessed, the method may skip directly to S807, without assessing the global rules 43 again.

If the previous transition was a global transition, the method moves to S823, which determines the root node for the current dialogue pathway. For a set of nodes directly connected together, the root node is the first node inside that flow. For the main dialogue pathway, the root node is the start node. For sub-flow, the root node is the first node in the sub-flow. The method moves to S805, where it transitions to the root node identified in S823, and the steps are repeated from S805.

One dialogue turn starts from S801 and ends when a listen function is executed. Therefore, one dialogue turn spans across at least two nodes.

In the above described method, step S813 allows a pre-condition to be checked before executing a node function. This means that the dialogue is less likely to repeat questions to users which have already been answered. In other words, S813 allows the method to skip over a say function and transition to the next node if the dialogue information 41 already contains the relevant information for a particular node. This may result in fewer dialogue turns to capture the same information from the user, meaning that fewer messages are exchanged between the system and a user device for example.

The pre-conditions correspond to checkpoints which are used for dialogue repositioning. For nodes that do not have a pre-condition, the pre-condition is assumed not to be met by default. Thus, for those nodes, the method proceeds to S817 and the functions of the node are executed. All of the nodes in the main conversational pathway may comprise pre-conditions.

Figure 6:
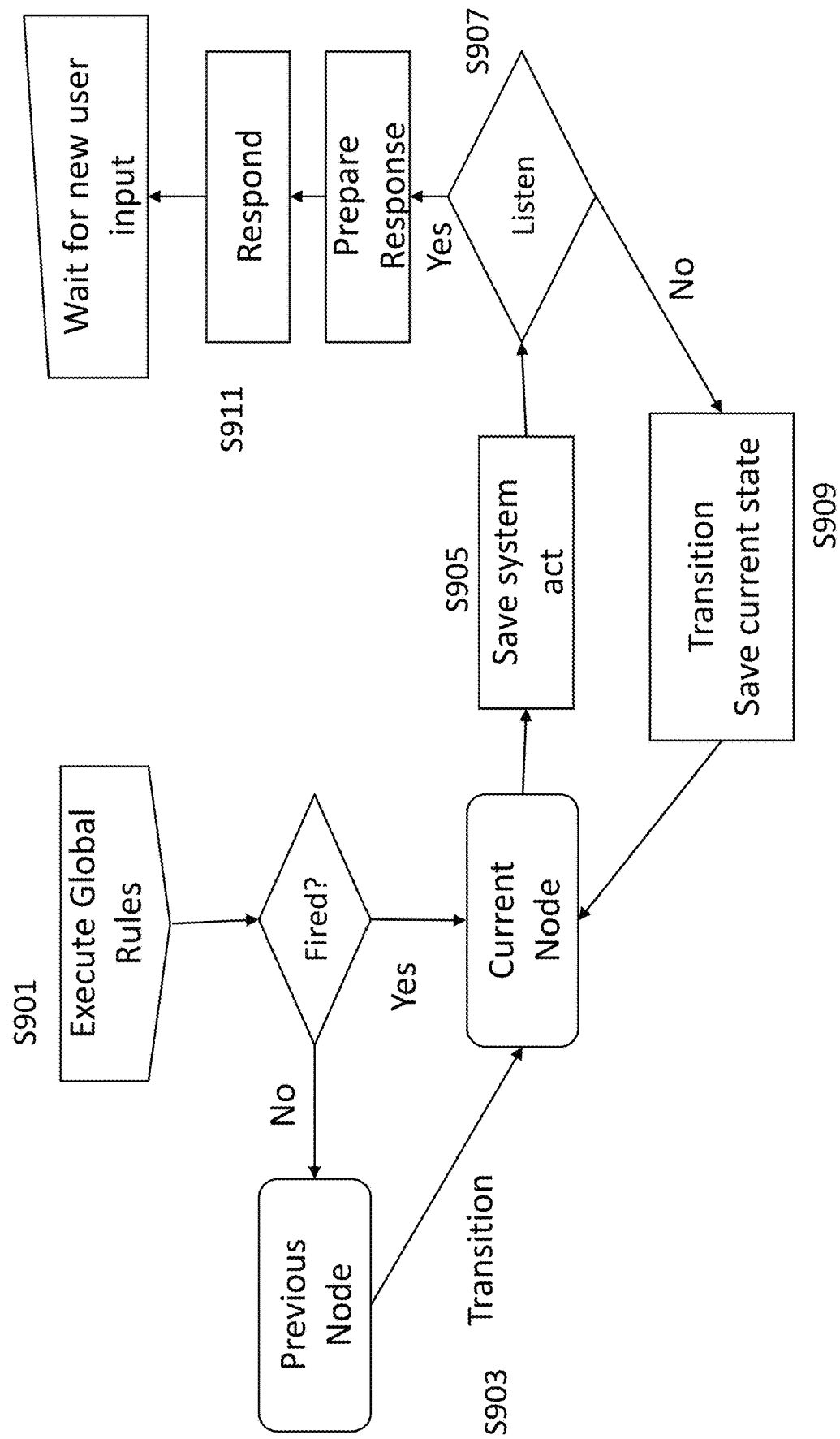
FIG. 6 shows a flowchart of a dialogue method according to an embodiment.

FIG. 6 shows a flowchart of a dialogue method according to an embodiment, in which a dialogue system interacts with a human user. In particular, FIG. 6 illustrates steps executed during a dialogue turn. The method may be performed on a dialogue system such as has been described in relation to FIG. 1. The method may be performed by the engine 44 described in relation to FIG. 2 above for example.

The turn begins by assessing the global rules 43 in S901. If a rule defining a global transition triggers, then the transition defined by the global rule is made to the new current node. If not, entry into the new current node is initiated by a local transition specified by the previous current node in S903.

At the new current node, a system act, for example a dialogue act, is saved in the turn information 51 in S905. At S907, it is determined if the node comprises a listen function. If there is no listen function, the system executes the transition function of the current node in S909, to transition to the next node. Steps S905, S907 and S909 are repeated until the current node comprises a listen function. At this point, the system prepares a response by concatenating the saved dialogue acts, outputs the response, and awaits a new user input S911. Responses are constructed by putting together multiple utterances specified by the nodes that the system has traversed during a turn.

Figure 4:
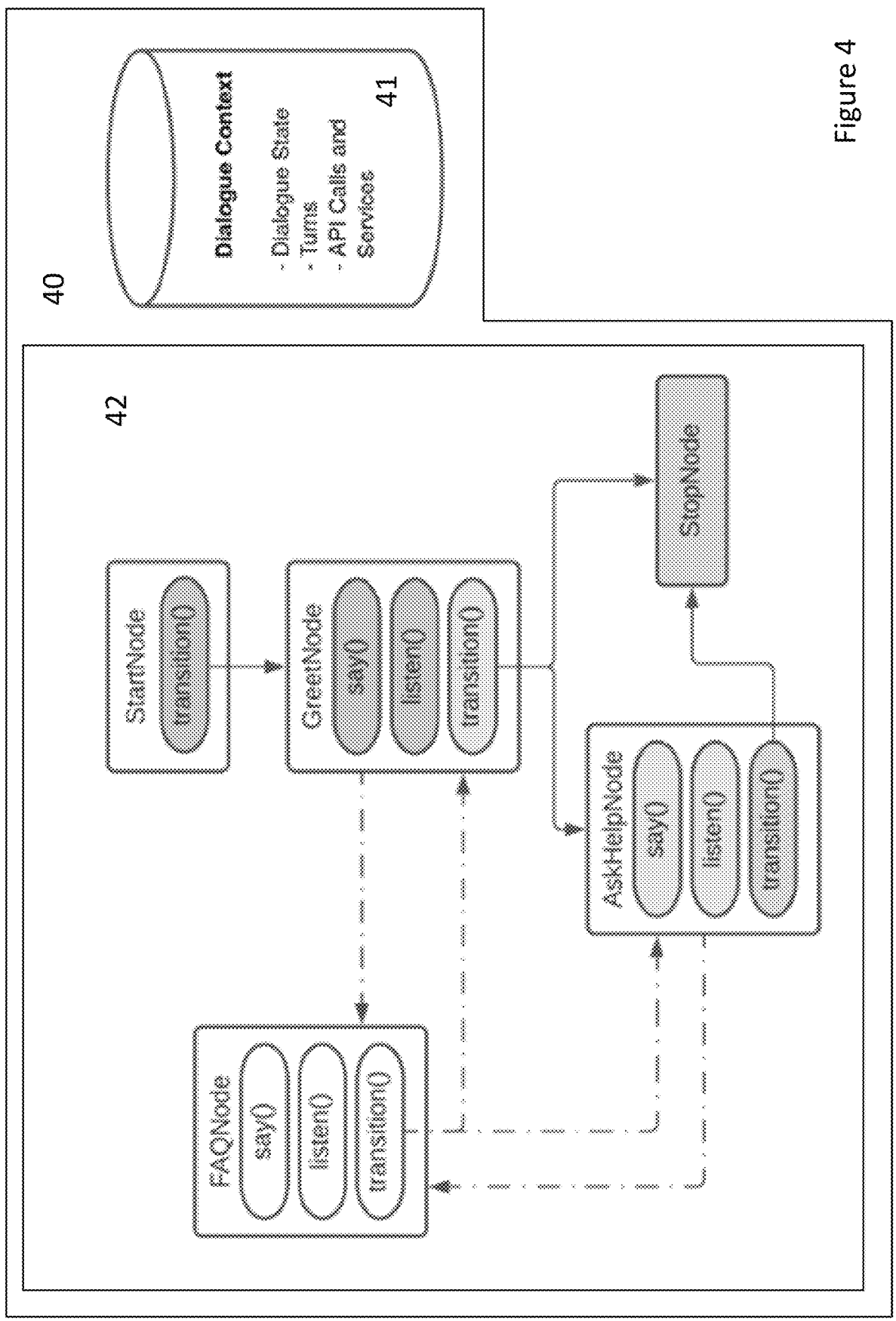
FIG. 4 is a schematic illustration of components of a policy module used in a method in accordance with an embodiment.

FIG. 4 is a schematic illustration of components of a policy module 40 which may be used in a dialogue method according to an embodiment. The figure shows a state machine 42 and the stored dialogue information 41. The engine and global rules are not shown. The dialogue policy module 40 is used to converse with a user in order to complete a certain task. The state machine 42 models a dialogue pathway step-by-step for a particular use case. Different nodes representing different points in the conversation are shown, together with the possible local transitions between the nodes, which are shown with solid arrows. The dialogue pathway starts at a start node (StartNode) and ends at an end node (StopNode). As well as the components of the state machine 42, the possible global transitions are also shown in dashed lines.

The nodes each include one or more of the "say( )", "listen( )", and "transition( )" functionality described previously. An exception is the "StopNode", which marks the end of the conversation, and which does not include any of those functionalities. During the dialogue, the engine 44 (not shown) performs the following method, starting from the StartNode, which is the first state into which the policy state machine enters when the conversation is initiated. The method follows the following steps until a StopNode (which is a state representing the end of the conversation) is reached, or the system stops to listen for a user input:

1. Scan through the list of global rules 43 in the predefined order and check the conditions. If a condition is met, execute the rule action. Whenever an action returns a node or the list of the global rules is exhausted, the scanning through the list is stopped.
2. The engine executes the transition function, either specified by the global rule or the local transition of the current node, to get the next node and transits to it.
3. The engine executes the say and listen functions at the next node to decide what to reply and whether to listen for the next turn or not.
4. This process loops until a StopNode is reached or the system returns a listen object with listen=True (that is the system stops to listen for a user input).

The execution of the dialogue comprises an interplay between global transitions and the local state machine. The interplay between global transitions and the local state machine enables a global transition from any point in the conversation to a particular node to be made. This allows for non-linear conversations. In other words, from a current node (which represents the current status of the conversation), a global transition may be made to a node that has not been predefined in the current node.

In the example illustrated in FIG. 4, an example dialogue with a user is illustrated with the shading of the node transitions and actions. Different shadings represent different dialogue turns. Each such dialogue turn spans across at least two nodes. The dialogue starts at a StartNode. The StartNode is a skip node for all global rules, and therefore no global rules are assessed. There is an initial local transition from the StartNode to the Greet Node. The say and listen functions of the GreetNode are performed. At the GreetNode, the "say( )" function causes the system to output a message such as "Hi", "Hello", or "Hello, how can I help you today?". The "listen( )" function of GreetNode is then executed to listen for an input from the user. The operation of the "listen( )" function will be described further below. This is the end of the first dialogue turn.

From the next utterance provided by the user, the NLU collects information. In particular, the NLU determines whether an intent, or any variable (slot, slot values) of the dialogue state has been provided. In this example, each dialogue turn starts from the node designated as the current node. The second dialogue turn therefore starts at the GreetNode. Following the user utterance, global rules are again assessed. A global transition is possible at this stage, to the "FAQ node". Each global rule is considered, and, if a condition for a rule is met, then an action is performed. Here, no conditions for a global transition are met. The "transition( )" function of the GreetNode is therefore executed. The GreetNode comprises a transition function specifying two alternative nodes—if a first condition is met, the transition function returns the "AskHelpNode", if a second condition is met, the transition function returns the "StopNode". In this case, the first condition is met, and therefore the "AskHelpNode" becomes the current node. After greeting the user in GreetNode, there is a transition to AskHelpNode to collect information about user's intent. The say and listen functions of the AskHelpNode are performed. This is the end of the second dialogue turn.

The third dialogue turn starts at the AskHelpNode. At the start of the third dialogue turn, the global rules are again assessed. A global transition is again possible at this stage, to the "FAQ node". However, the condition for the relevant global rule is again not met. The transition function of the AskHelpNode is therefore executed. The transition function of the AskHelpNode outputs the Stop Node.

In the policy module 40 of FIG. 4, there is a global rule comprising an action returning the FAQNode when a certain condition has been met. For example, the user asking "What are your opening hours?" would trigger a global rule that directs the dialogue to a subflow that addresses such FAQs. The engine then executes a global transition to the FAQNode. The transition to the FAQNode is a global transition, because it is initiated by a global rule.

A listen function, listen( ), defines what the system expects to hear back from the user. The function listen( ) specifies the listen behaviour of the system, which may include one or more of the following for example: how long the system should wait for, how many digits the system should expect, what languages, which channel (speech, DTMF, chat), which keywords or key phrases the system should pay attention to, should the system issue an interjection to acknowledge users if they speak for too long.

The function returns a "Listen" object that defines what the system expects to hear back from the user. The "LISTEN" object is a dataclass used by the policy module 40 to instruct other system components, such as the NLU module, what to do or expect. The "LISTEN" object may comprise a list of attributes, which may comprise one or more of:

Language: the language of the conversation, for example English;

Channel: the channel that the system is expecting a user to respond in—this might be either DTMF (where a user provides an input by pressing keys on a keypad) or speech for example;

Listen: defines whether or not the system should listen, for example, some nodes have the Listen object set to False so that the node does not perform a listen function.

The "LISTEN" object may comprise one or more "Expect" objects. The "Expect" object interacts with the NLU component and/or ASR component to indicate what to expect from the user. Thus, the NLU component may detect intent, or retrieve slots and values with greater accuracy. The expect objects may be used to bias in a positive way some of the decisions made by the NLU. For example, if the system asked about party size in the restaurant booking domain, the expected answer is a number. Biasing the ASR module accordingly means that the ASR produces the phrase 'three people' instead of 'free people' for example.

The expect objects may comprise one or more of the following:

"AsrExpect": used to bias the ASR module so that the ASR module transcribes expected terms with greater accuracy. The "AsrExpect" object may comprise a list of expected fields to take advantage of predefined biasing terms, a list of keywords, or a customised biasing dictionary.

"NluExpect": contains information to instruct the NLU module how to behave for the next turn. For example, "NluExpect" comprises a set of regular expressions to be matched for the next user input, a list of guesses from previous turns, and/or a list of system requested slots. The system requested slots feeds into the NLU to provide contextual cues for the predictions.

"DtmfExpect": contains a set of metadata used when a DTMF input is expected.

Although in the above described examples, each node is a single node, composite nodes can be formed, in which a node represents a block of nodes, and, therefore, represents a state machine itself. Such nodes may be used in libraries as reusable policy modules for example, which comprise a state machine wrapped inside a composite node.

As described above, optionally, before executing a function of a node, a precondition is assessed to check whether there is a need to execute that function, based on whether a state variable is filled or not in the dialogue state information 55 for example. This is referred to as checkpoint repositioning. Checkpoint based repositioning enables the engine to skip functions of the nodes. From the start node, the engine skips through the nodes using the pre-conditions. At each node, the pre-condition is checked. If no pre-conditions are met, the functions defined by that node are performed. This node is also referred to as having an active checkpoint, in other words the pre-condition indicates that we should continue from that node. Here, the pre-conditions are implemented such that if a pre-condition is met the node function is skipped, and if the pre-condition is not met the node function is performed. However, the pre-conditions can equally be implemented in the reverse fashion, so that if a pre-condition is met the node function is performed, and if not met the node function is skipped.

In one example implementation, the method returns to the start node at the start of each dialogue turn. In this case, the pre-conditions mean that the method can skip through the nodes of the main flow to reach the relevant node for the dialogue turn.

In an alternative example implementation, the current node is stored in the dialogue state information 41. The method returns to the current node at the start of each dialogue turn. In this example, the pre-conditions are only assessed for dialogue turns after a global rule has triggered. Checkpoint based repositioning is used only if a global rule triggers which breaks the intended main flow. The repositioning is then activated, and the pre-conditions are assessed, stopping at the first node for which the pre-conditions are not met.

As has been described above, user behaviour in conversations can be non-linear. Users tend to sometimes take initiative in a conversation and provide information the system hasn't asked for, ask additional questions or provide more information than required. The following user responses are examples:

System: What do you want to do?
User: I want to book a table for tomorrow
System: How many people?
User: Before we proceed, do you have child seats?
System: Can you give me your phone number for the booking?
User: Actually, make it 3 people!

As has been described previously, including a set of global rules 43 in the policy module 40 can allow the policy module to handle such user responses. However, in some examples, applying the global rules can result in the system asking repeatedly for the same information. For example, where a user provides a date, time and party size for a booking, but then later in the conversation requests a change of time, a global rule condition on a change in the time slot value will trigger. This will return the dialogue to a node comprising a say function that requests the date, time and party size information. However, this information has already been provided by the user.

By assessing a precondition before executing the say function of the node, a second request for information which is already stored in the dialogue information 41 is avoided. In the case that the information (e.g. the date, time and party size slot values) is already stored in the dialogue information 41, the transition function of the node may be directly executed, skipping the say function.

A "pre-condition" is assessed before executing one or more functions of a node. The pre-conditions allow for dialogue repositioning. The assessment of a pre-condition is also referred to as a "checkpoint". The checkpoint comprises assessing the pre-condition to check if the dialogue information associated with the node is already stored in the stored dialogue information 41. If not, then the system needs to request it, and the node should execute the say( ) and listen( ) functions for example. If the information is already stored, then the node transition function should be executed.

Although the pre-condition has been described above in relation to a node comprising a say and listen function, for a node comprising a call function, the same procedure is applied. For example, the checkpoint checks if the same API call has been made previously, by confirming if the information is stored in the "turns" information in the dialogue information 41.

The checkpoints allow for answering a question in a side flow, and going back to the previous position in the main flow. The checkpoints allow for rewriting the dialogue state, acknowledging this, checking constraints again, checking new availability, and positioning back to the previous position in the dialogue, if the constraints and availability are fine. In other words, a global rule may trigger a transition to a node that is in the same branch of the policy graph (the main flow) and 'vertically' behind the current node. For example, referring to the restaurant booking example below, if the information for the restaurant booking has already been filled and then the user wants to change the time, the nodes which check availability and ask for confirmation can be accessed again. The checkpoints allow for skipping over functions in these nodes which do not need to be performed again (for example, requesting the party size again). When executing a turn from the Start node, the system is able to determine the active node to continue from by assessing the pre-conditions, based on the dialogue state information 55 stored in the dialogue information 41.

When there are a set of nodes linked together, the global transition is followed by a reposition of the conversation to the first node inside that flow.

The following is an example conversation in which check points are used to perform re-positioning:

User: Can I book a table at 6 pm for 3 people?
System: Wat day?
U: Tomorrow
S: Ok, we have a table available, can I have a phone number?
U: Can you change it to 8 pm?
S: Sure, let me check . . . Sorry there's nothing available at that time, can you make it 9 pm?
U: No
S: What time would you like to come in?
U: 7 pm
S: Ok, let me check . . . good, we have a table available at that time, can I have your phone number?
U: 123456789
S: And a name for the booking?
U: Can you change it to 11:30 pm?
S: Sorry, the restaurant closes at 11 pm, what time would you like to come in?
U: 7 pm then
S: Can I have a name for the booking?
U: Can I make it 6 pm?
S: Ok, let me check . . . good, we have a table available at that time. Can I have a name for the booking?
U: Spider Man
S: Shall I make the booking?
U: Yes
S: OK. Your booking is complete Each repositioning is due to a time change by the user. Each time it repositions to a different point in the dialogue. For example, when the user inputs 7 pm for the second time, an API call is skipped because the information is previously stored in the dialogue information 41. Each time it repositions it checks the time constraints, checks if the availability API call needs to be done, and checks if the name or phone number have already been requested for example.

Examples of dialogues between a system and a user will now be described.

Example 1 (a)

Figure 7:
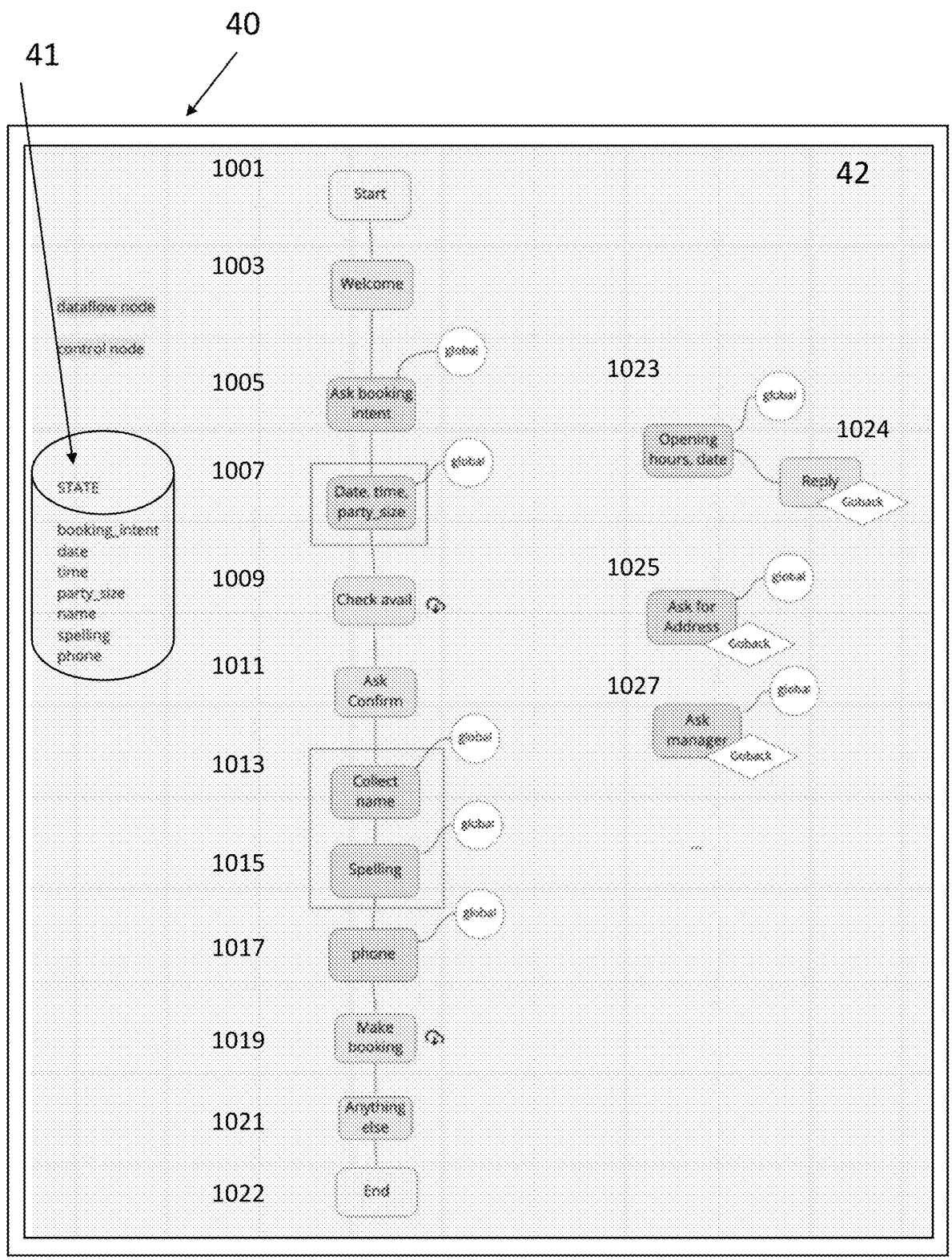
FIG. 7 shows a schematic illustration of a policy module used in a method according to an embodiment for a booking task in a restaurant domain.

In Example 1 (a), an example dialogue between a system and a user for a booking task in the restaurant domain is performed using a system according to an embodiment. FIG. 7 shows a schematic illustration of various components of a policy module 40 included in the system according to an embodiment. The policy module 40 is an example policy module 40 for the booking task in the restaurant domain.

The policy module 40 comprises stored information relating to the dialogue 41, as has been described previously. The dialogue state information 55 comprises a plurality of slots. The dialogue state information 55 in this example comprises the following slots: date, time, party_size, name, spelling, and phone. The dialogue state information 55 further comprises information about the intent.

The policy module 40 further comprises a state machine 42 comprising a plurality of nodes. In this example, the state machine 42 comprises the following nodes.

Start node 1001: comprises a transition function "start node→welcome node";
Welcome node 1003: comprises a say function and a transition function "welcome node→ask booking intent node";
Ask booking intent node 1005: comprises a say function, a listen function and a transition function "ask booking intent node→date, time, party_size node";
Date, time, party_size node 1007: comprises a say function, a listen function and a transition function "date, time, party_size node→check availability";
Check availability node 1009: comprises a call function and a transition function "check availability→ask confirm";
Ask confirm node 1011: comprises a say function, a listen function and a transition function "ask confirm→collect name";
Collect name node 1013: comprises a say function, a listen function and a transition function "collect name→spelling";
Spelling node 1015: comprises a say function, a listen function and a transition function "spelling→phone";
Phone node 1017: comprises a say function, a listen function and a transition function "phone→make booking";
Make booking node 1019: comprises a call function and a transition function "make booking→anything else";
Anything else node 1021: comprises a say function, a listen function and a transition function "anything else→end";
End node 1022: comprises no functions.

Each of the above nodes comprises a transition to a next node, where the transitions flow from the start node 1001 to the end node 1022. This is indicated in FIG. 7 by the solid lines between the nodes, which show the paths of the local transitions.

The policy module 40 comprises a plurality of additional nodes, which are not accessed through local transitions, in other words they are not accessed through the transition function of another node:

Opening hours, date node 1023: comprises a transition function "opening hours, date→reply";
Ask for address node 1025: comprises a say function and a transition function "ask for address→Start";

Ask manager node 1027: comprises a call function and a transition function "ask manager→Start";

The reply node 1024 comprises a say function and a listen function, and a transition function "reply→Start".

In the figure, the cloud symbols next to some nodes ("Check Avail" and "Make Booking") represent API calls. API calls may be understood as communication with a third party (knowledge) database, from which information is queried and retrieved. The call function for these nodes is the API call.

The bounded boxes (e.g., the one around Date, Time, Party_size, or the one around Collect name+Spelling) are library modules that can be imported from a prebuilt set of subflows. This subflow set can also support other functionalities such as complete identification and verification, etc.

The following nodes are control flow nodes: Welcome node 1003, Check availability node 1009, Ask confirm node 1011, Make booking node 1019, Anything else node 1021, and Reply node 1024. These nodes are accessed through a local transition.

The following nodes are data flow nodes: Ask booking intent node 1005, Date, time, party_size node 1007, Collect name node 1013, Spelling node 1015, Phone node 1017, Opening hours date node 1023, Ask for address node 1025, and Ask manager node 1027. As explained previously, the data flow nodes can be accessed through either a local transition or a global transition.

An example dialogue with a user, which is performed using the system comprising the policy module 40 will now be described.

The dialogue starts at the "start node" 1001, which is a skip node for all global rules. The transition function of the start node 1001 is therefore executed. The transition function of the start node 1001 is "start node→welcome node". From the start node 1001, the dialogue policy therefore transitions to a "welcome node" 1003, which may also be referred to as a "Greet node". This is a local transition.

It is checked whether the current node is a stop node. Since the "welcome node" 1003 is not a stop node, the dialogue continues. Since a greeting has not yet been outputted by the system, the pre-condition is not met, and the say function of the "welcome node" 1003 is executed. The say function results in a system output of:

System: "Hi welcome to <restaurant name>".

The "welcome node" 1003 does not have a listen function, so this output is stored for now.

The list of global rules is assessed, to determine if any of the conditions are met. At this stage in the dialogue, none of the conditions are met. The transition function of the "welcome node" 1003 is therefore executed. The transition function of the "welcome node" 1003 is "welcome node→ask booking intent". This is a local transition.

From the "welcome node" 1003, the dialogue policy transitions to the "ask booking intent node" 1005. Since this node is not a stop node, the dialogue continues. At "the ask booking intent node" 1005 a pre-condition is checked. In this case, the pre-condition is not fulfilled. The pre-condition is that the intent of booking has been collected. The say function of the "ask booking intent node" 1005 is executed. The say function results in a system output of:

System: "I can make a booking or answer questions. How can I help?"

This is output together with the previously stored system output "Hi welcome to <restaurant name>". The "listen" function of the "ask booking intent node" is then performed. The user replies with:

User: "I want to book a table this Thursday for 2 people".

A transition is then made to the Start node 1001 and the next dialogue turn starts.

The list of global rules is assessed, to determine if any of the conditions are met. At this point in the dialogue, the conditions for the following global rules are met:

1. If "date" slot value is changed, then go to "date, time, party_size" node 1007;
2. If "party_size" slot value is changed, then go to "date, time, party_size" node 1007;

A global transition is therefore made to the "Date, time, party_size" node 1007. Since this node is not a stop node, the dialogue continues. At this node the pre-condition for the "Date, time, party_size" node 1007 is checked. The pre-condition for the "Date, time, party_size" node 1007 comprises:

If "date" slot is filled, then do not say "request date";
If "party_size" slot is filled, then do not say "request party size";
If "time" slot is filled, then do not say "request time".

In this case, the "date" and "party_size" slots are filled, therefore these values are not requested again. The "time" slot is not filled, and therefore the say function is executed at the "Date, time, party_size" node 1007. Since all of the pre-conditions are not fulfilled, therefore the say function is executed, and the system outputs:

System: "What time are you looking for?"

The "listen" function of the "Date, time, party_size" node 1007 is then performed. The user replies with:

User: "When do you open?"

A transition is then made to the Start node 1001 and the next dialogue turn starts.

The list of global rules is assessed, to determine if any of the conditions are met. At this point in the dialogue, the condition for the following global rule is met:

3. If "intent" is detected as "what are opening hours", then go to "opening hours, date" node 1023;

A global transition is therefore made to the "opening hours, date" node 1023. Since this node is not a stop node, the dialogue continues. Note that in this example, there are no pre-conditions for the "opening hours, date" node 1023 or for other FAQ nodes such as "ask for address" node 1025 or "ask manager" node 1027. The functions of the "opening hours, date" node 1023 are performed. There is no listen function for the "opening hours, date" node 1023, but the node was reached through a global transition, and therefore the root node of the sub-flow is identified. In this case, the root node of the sub-flow is the "opening hours, date" node 1023 itself, and therefore the "transition" is simply to the same node. There are no pre-conditions and no listen function, and this time the "opening hours, date" node 1023 was not reached through a global transition, and therefore the transition function of the "opening hours, date" node 1023 is executed. The transition function of the "opening hours, date" node 1023 is "opening hours, date node→reply node". This is a local transition.

Since the "reply node" 1024 is not a stop node, the dialogue continues. There is no pre-condition to be checked. The say and listen functions of the "reply node" 1024 are executed, and the system replies with:

System: "We are open from 9 am to 9 pm on Thursday"
The user then answers with:
User: "Cool, book me at 5 pm for 2 people"

A transition is then made to the Start node 1001 and the next dialogue turn starts.

The list of global rules is then assessed, to determine if any of the conditions are met. At this point in the dialogue, the conditions for the following global rule is met:

4. If "time" slot value is changed, then go to "date, time, party_size" node 1007;

A global transition is therefore made to the "Date, time, party_size" node 1007. Since this node is not a stop node, the dialogue continues. At the "Date, time, party_size" dataflow node 1007, the pre-condition for the "Date, time, party_size" node 1007 is checked. In this case, the "date", "time" and "party_size" slots are filled, and therefore the pre-condition is fulfilled. The say and listen functions of the "Date, time, party_size" node 1007 are therefore not executed. The transition was a global transition, and therefore the method returns to the root node, which for the main pathway is the start node. The pre-conditions of the nodes in the main pathway from the start node are checked. In this case, the pre-condition for the welcome node 1003 is that a greeting has been outputted by the system. This pre-condition has been fulfilled, and therefore the local transition of the welcome node 1003 is performed, skipping the functions of the welcome node 1003. The pre-condition of the "ask booking intent" node 1005 is also met, and therefore a local transition back to the "Date, time, party_size" node 1007 is performed. The pre-condition for the "Date, time, party_size" node 1007 is fulfilled, and therefore, the transition function of the "Date, time, party_size" node 1007 is executed. The transition function of the "Date, time, party_size" node 1007 is "Date, time, party_size node→check availability". The method transitions to the "check availability" node 1009. This is a local transition.

Since this node is not a stop node, the dialogue continues. At the "check availability" node 1009, which is a node that makes an API call, a pre-condition is checked to determine if an API call has been made previously. The pre-condition is not met.

The "check availability" node 1009 does not have a say or listen function, but has an "API call" function. The "API call" function is therefore executed. An API call is made to check the availability from the database, in other words to check whether a table for 2 people is available at the requested time and date. In this example, a table is available. After executing the API call, the dialogue information 41 is updated to log that for this particular combination of (date, time, party_size) there is availability. For example, the information is stored in the "turns" object of the dialogue information 41.

The list of global rules is again assessed, to determine if any of the conditions are met. There is a global rule that triggers if there is no availability at the requested time. For example, the global rule may cause a transition back to a previous node. Alternatively, the global rule comprises additional logic suggesting alternative times to the user (not shown).

At this stage in the dialogue, none of the conditions are met. The transition function of the check availability node 1009 is therefore executed. The transition function of the check availability node 1009 is "check availability node→ask confirm". This is a local transition.

From the check availability node 1009, the dialogue policy transitions to the "ask confirm" node 1011. Since this node is not a stop node, the dialogue continues. Since the user has not provided confirmation yet, no precondition is met and the say function of the "ask confirm" node 1011 is executed. The say function results in a system output of:

System: "Great, we have a table this Thursday at 5 pm for 2 people, should I book in for you?"

The "ask confirm" node 1011 also executes the "listen" function and awaits for a user input. The user replies:

User "Yes".

A transition is then made to the Start node 1001 and the next dialogue turn starts.

The list of global rules is again assessed, to determine if any of the conditions are met. At this stage in the dialogue, none of the conditions are met. A local transition is therefore performed to the welcome node 1003. The pre-conditions enable the method to skip the functions of the nodes in the main flow up to the "ask confirm" node 1011, and the local transitions are performed to this node. The transition function of the "ask confirm" node 1011 is then executed. The transition function of the "ask confirm" node 1011 is "ask confirm node→collect name node". This is another local transition.

From the "ask confirm" node 1011, the dialogue policy transitions to the "collect name" node 1013. Since this node is not a stop node, the dialogue continues. At the "collect name" node 1011, which is a dataflow node, a pre-condition is checked. In this case, the pre-condition is not fulfilled, where the pre-condition assesses whether the name slot is filled. The say and listen functions of the "collect name" node 1013 are executed. The say function results in a system output of:

System: "Can I have the name of your booking?"

The user, however replies with:

User: "Oh, actually, my friend is coming too. Can you make it 3"

A transition is then made to the Start node 1001 and the next dialogue turn starts.

The list of global rules is then assessed, to determine if any of the conditions are met. At this point in the dialogue, the conditions for the following global rules are met:

2. If "party_size" slot value is changed, then go to "date, time, party_size" node 1007;

A global transition is therefore made to the "Date, time, party_size" node 1007. Since the node is not a stop node, the dialogue continues. The pre-condition for the "Date, time, party_size" node 1007 is checked. In this case, the "date", "time" and "party_size" slots are filled, and therefore the pre-condition is fulfilled, and the say and listen functions of the "Date, time, party_size" node 1007 are not executed. The method returns to the root node and runs through the pre-conditions and local transitions, returning to the "Date, time, party_size" node 1007, where the transition function of the "Date, time, party_size" node 1007 is executed. The transition function of the "Date, time, party_size" node 1007 is "Date, time, party_size node→check availability". The method transitions to the "check availability" node 1009. This is a local transition.

Since this node is not a stop node, the dialogue continues. At the "check availability" node 1009 a pre-condition is checked as described above.

The "check availability" node 1009 does not have a say or listen function, but has an "API call" function. The "API call" function is therefore executed. An API call is made to check the availability from the database, in other words to check whether a table for 3 people is available at the requested time and date. In this example, a table is available.

A transition is then made to the Start node 1001.

The list of global rules is again assessed, to determine if any of the conditions are met. At this stage in the dialogue, none of the conditions are met.

The transition function of the "check availability" node 1009 is therefore executed. The transition function of the "check availability" node 1009 is "check availability node→ask confirm". This is a local transition.

From the "check availability" node 1009, the dialogue policy transitions to an "ask confirm" node 1011. Since this node is not a stop node, the dialogue continues. Since confirmation has not yet been provided, no pre-condition is met and the say and listen functions of the "ask confirm" node 1011 are executed. The say function results in a system output of:

System: "Hang on a sec, let me check. Great, we have a table . . . XXX . . . Should I book it for you?"

The user, however replies with:

User: "What's your address actually?"

A transition is then made to the Start node 1001 and the next dialogue turn starts.

The list of global rules is then assessed, to determine if any of the conditions are met. At this point in the dialogue, the conditions for the following global rules are met:

5. If "intent" is detected as "what is address", then go to "ask for address" node 1025;

A global transition is therefore made to the "ask for address" node 1025. Since this node is not a stop node, the dialogue continues. The "ask for address" node 1025 is not part of the main flow (shown on the left in FIG. 7). The "ask for address" node 1025 may be referred to as a sub-flow. The nodes in the sub-flow do not comprise pre-conditions in this example. In this case, the say function of the "ask for address" node 1025 is executed, and the system replies with:

System: "Address is 2 London Avenue.

There is no listen function. The transition was a global transition, and therefore the method returns to the root node, which in this sub-flow is the "ask for address" node 1025. A local transition from the "ask for address" node 1025 to the Start node 1001 is then executed.

The list of global rules is again assessed, to determine if any of the conditions are met. At this stage in the dialogue, none of the conditions are met.

From the start node 1001, a local transition is made to the welcome node 1003. At the welcome node 1003, since a greeting has been outputted by the system, the pre-condition is met, the say function is not performed and the transition of the welcome node is directly performed. The policy then transitions to the ask booking intent node 1005. At this node, the pre-condition is also met since the booking intent has been provided. Thus, the local transition of the booking intent node is performed. A transition is made to the "date, time, party_size" node 1007. At said node, the pre-condition is also met since this information has been provided. Thus, the local transition of the "Date, time, party_size" node 1007 is performed. A local transition is made to the "Check avail" node 1009. At said node, a pre-condition is met since the API call has been made before. A local transition to the Ask confirm node 1011 is therefore made. At the ask confirm node 1011, no pre-condition is met and the conversation resumes here. The engine skips through the nodes 1003 to 1011 by checking the pre-conditions. How the pre-conditions are used to skip through nodes is described further below in Example 1(b). Briefly, the pre-conditions enable the policy module 40 to recognise that slots associated to the node are filled or that functions associated to the node have been performed, and, therefore, the functions specified by the nodes are skipped and, instead, the local transitions defined by the nodes are performed.

At the "ask confirm" node 1011, since this node is not a stop node, the dialogue continues. At the "ask confirm" node 1011, a pre-condition checks whether confirmation has been provided previously. No pre-condition is met since no confirmation has been provided previously. The say function of the "ask confirm" node 1011 is executed. The say function results in a system output of:

System: "Should I book it for you?"

The user replies:

User: "Yes".

A transition is then made to the Start node 1001 and the next dialogue turn starts.

The list of global rules is again assessed, to determine if any of the conditions are met. At this stage in the dialogue, none of the conditions are met.

From the start node 1001, the following local transitions are made directly, since the respective pre-conditions are met: start→Welcome→Ask Booking Intent→Date, time, party_size→Check avail→Ask confirm→Collect name. The local transitions are performed, without the other functions of the nodes being executed, as the pre-condition is met for each of these nodes other than the Collect name node 1013. The local transitions correspond to what has been described for the previous dialogue turn.

From the "ask confirm" node 1011, the dialogue policy transitions to a "collect name" node 1013. Since this node is not a stop node, the dialogue continues. At the "collect name" node 1013, which is a "dataflow" node, the pre-condition is again checked. In this case, the pre-condition is not fulfilled, and therefore the say and listen functions of the "collect name" node 1013 are executed. The say function results in a system output of:

System: "Can I have the name of your booking?"

The dialogue continues in this manner, until the stop node 1022 is reached. At this point, the dialogue ends.

Optionally, the global rules 43 comprise a global rule which triggers when the user's message relates to a change in a value associated with a slot in the dialogue state information 55, and which comprises an action to transition to an "Acknowledgement" node (not shown). The "Acknowledgement" node comprises a say function to indicate to the user that the change has been recognised. The acknowledgement node comprises transition information identifying a transition to the start node 1001.

Example 1 (b)

Example 1 (b), is an example of part of a dialogue between a system and a user. Example 1 (b) is similar to Example 1 (a) and is based on the policy module 40 of FIG. 7 and concerns a restaurant booking. Example 1 (b) illustrates checkpoint-based dialogue repositioning.

In Example 1 (b), the user has already stated their intent in a previous dialogue turn. Thus the "booking_intent" slot in the dialogue state 55 is already filled. Following a later dialogue turn, the policy engine 44 transitions back to the start node 1001.

From the start node 1001, a transition is made to the welcome node 1003 ("start node→welcome node"). At the "welcome" node 1003, a pre-condition is checked to determine whether a greeting has been outputted in a the current or a previous turn. In this case, the precondition is met and the transition function specified by the welcome node ("welcome→ask booking intent") is executed. Transitioning from the "welcome" node to the "ask booking intent" node, without outputting a greeting, may be referred to as skipping the welcome node.

At the "ask booking intent" node 1005, a precondition is checked to determine if the "booking_intent" slot is filled. In this case, it is. The local transition defined by "ask booking intent" node 1005 is executed. The local transition is the transition to the "date, time, party_size" node 1007. Transitioning from the "ask booking intent" node to the "date, time, party_size" node, without performing the functions of the "ask booking intent" node, may be referred to as skipping the "ask booking intent" node.

At the "date, time, party_size" node 1007, pre-conditions are checked as described in Example 1(a). At this stage, the preconditions are not met and the say and listen functions of "date, time, party_size" node are executed. The user replies stating that she needs a booking for 6 people, and then she mentions her phone number.

The next dialogue turn starts at the start node 1001. The list of global rules is again assessed, to determine if any of the conditions are met. At this stage in the dialogue, the mention of "6 people" triggers a global rule that causes the "party_size" slot in the dialogue state information 55 to be updated. The mention of the "phone number" also triggers a global rule that causes a global transition to the phone node 1017. A function is performed at the phone node 1017 which sets the "phone" value in the dialogue state information 55. A pre-condition causes the say and listen functions of the phone node 1017 to be skipped, since the phone number information is already stored. Since a global transition was performed to get to the phone node 1017, a transition is made to the start node 1001.

From the start node 1001, the following local transitions are skipped through following the pre-conditions: Start→Welcome→Ask Booking Intent. As explained above, at the "welcome" node, a pre-condition being met causes the system not to output anything (to avoid repeating the greeting). At the "Ask booking intent" node 1005, a pre-condition is checked to check if the intent of booking has already been collected. As described above, the booking_intent slot is filled and, therefore, the functions of the "ask booking intent" node are skipped such that a local transition to "date, time, party_size" node 1007 is made.

At "date, time, party_size" node 1007, a precondition is checked. As described above, the pre-condition relates to whether the "date". "party_size" and "time" slots of the dialog state 41 are filled. In this case, the "party_size" slot is filled (6 people) but not the "date" or "time". Thus, all of the preconditions are not met and some of the functions of the "date, time, party_size" node 1007 are executed. In this case, since the "party_size" slot is filled, this value is not requested again, while the "date" and "time" slots are requested.

When the "phone" node 1017 is entered again further along in the dialogue, the say function is skipped. A pre-condition is checked (the pre-condition is to check if the "phone" slot is filled), and since the phone number has already been provided, the local transition of the "phone" node (instead of its functions) is executed. The local transition is to the "make booking" node.

As illustrated in this example and in S821 and S815 of FIG. 5, where a global transition has been made, the method returns to the root node, and then performs the checkpoint-based repositioning.

Example 1 (c)

Example 1 (c), is another example part of a dialogue between a system and a user that is based on the policy module 40 of FIG. 7 and concerns a restaurant booking. Example 1 (c) also illustrates checkpoint-based dialogue repositioning.

In Example 1 (c), the "booking_intent", "date", "time", and "party_size" slots in the dialogue state 41 are filled. Further, the fact that an API call has been made previously at the "Check Avail" node 1009 has been logged (for example, in the "turns" information in the dialogue information 41). The "Check Avail" node comprises a precondition that skips the API call and instead performs the transition function when an API call has previously been made.

The user is asked to confirm the booking, that is, the "Ask Confirm" node 1011 is presently active. The system asks "Should I book it for you". The user responds "Yes, please, my phone number is 000 000 000". This is the start of the next dialogue turn. The list of global rules is assessed, to determine if any of the conditions are met. A first global rule triggers and updates the dialogue information 41 to indicate that the user has confirmed. A second global rule triggers, where the action is a global transition to the phone node 1017. A function is performed at the phone node 1017 which sets the "phone" value in the dialogue state information 55. A pre-condition causes the say and listen functions of the phone node 1017 to be skipped, since the phone number information is already stored. Since a global transition was performed to get to the phone node 1017, the method repositions back to the start node 1001.

From the start node 1001, the local transitions Start→Welcome→Ask Booking Intent are performed, since the pre-conditions for these nodes are met. The Ask Booking Intent node 1005 is skipped (since the "booking_intent" slot is filled, as explained above) and a transition is made to the "Date, time, party_size" node. The ""Date, time, party_size" node is also skipped since the "date", "time", "party_size" slots are filled, and a transition is made to the "Check Avail" node 1009. The "Check Avail" node 1009 is also skipped since an API call has been made as described above, and a transition to the "Ask Confirm" then made. Since the dialogue information 41 indicates that the user has confirmed, the "Ask Confirm" node pre-condition is met, and therefore a transition to the "Collect name" node is made. The system asks "Okay, can I have your name, please?". The system does not ask the user to confirm again. The next dialogue turn starts and the dialogue continues as described above.

If the user mentioned her phone number without saying "Yes, book it for me", for example the user states "Give me a minute, my number is 000 000 000", the dialogue state information 55 is not updated to indicate that the user has confirmed. The global transition to the phone node is performed, followed by the re-position to the start node. The pre-conditions allow to skip through the nodes, and the method continues at the "Ask confirm" node, again asking "Can I book it for you?".

The user then says:

User: "Actually, can you make it 6 pm, please?"

The next dialogue turn starts, and the list of global rules is again assessed, to determine if any of the conditions are met. The global rule "If "time" slot value is changed, then go to "date, time, party_size" node 1007" triggers. A global transition is made to the "date, time, party_size" node 1007", which performs a function updating the dialogue state information 55. The say and listen functions are skipped since the pre-condition is fulfilled. From the "Acknowledgement" node, the policy returns to the root node (Start node 1001).

From the Start node 1001, the policy module 40 repositions the conversation based on the following checkpoints:

a. intent collected? ✓
b. Correct constraints ✓
c. time or date collected? ✓
d. date collected? ✓
e. people collected? ✓
f. check avail ✓ (here, the system also acknowledges availability for the revised time)
g. Phone collected? ✓
h. name collected? ✗

In other words, from the root node (start node 1001), the following nodes are skipped "welcome", "ask booking intent", "date, time, party_size", and "ask confirm". At the "check avail" node, an API call is made to check availability at the new time value and the local transition defined by said node is then executed. At the "Collect name" node, the associated slot "name" is determined as not being filled, so the pre-condition is not met, and the functions associated with the "collect name" node are executed. Thus, after the user's previous response to change the time, the conversation resumes from the "collect name" node 1013.

Example 2

Figure 8:
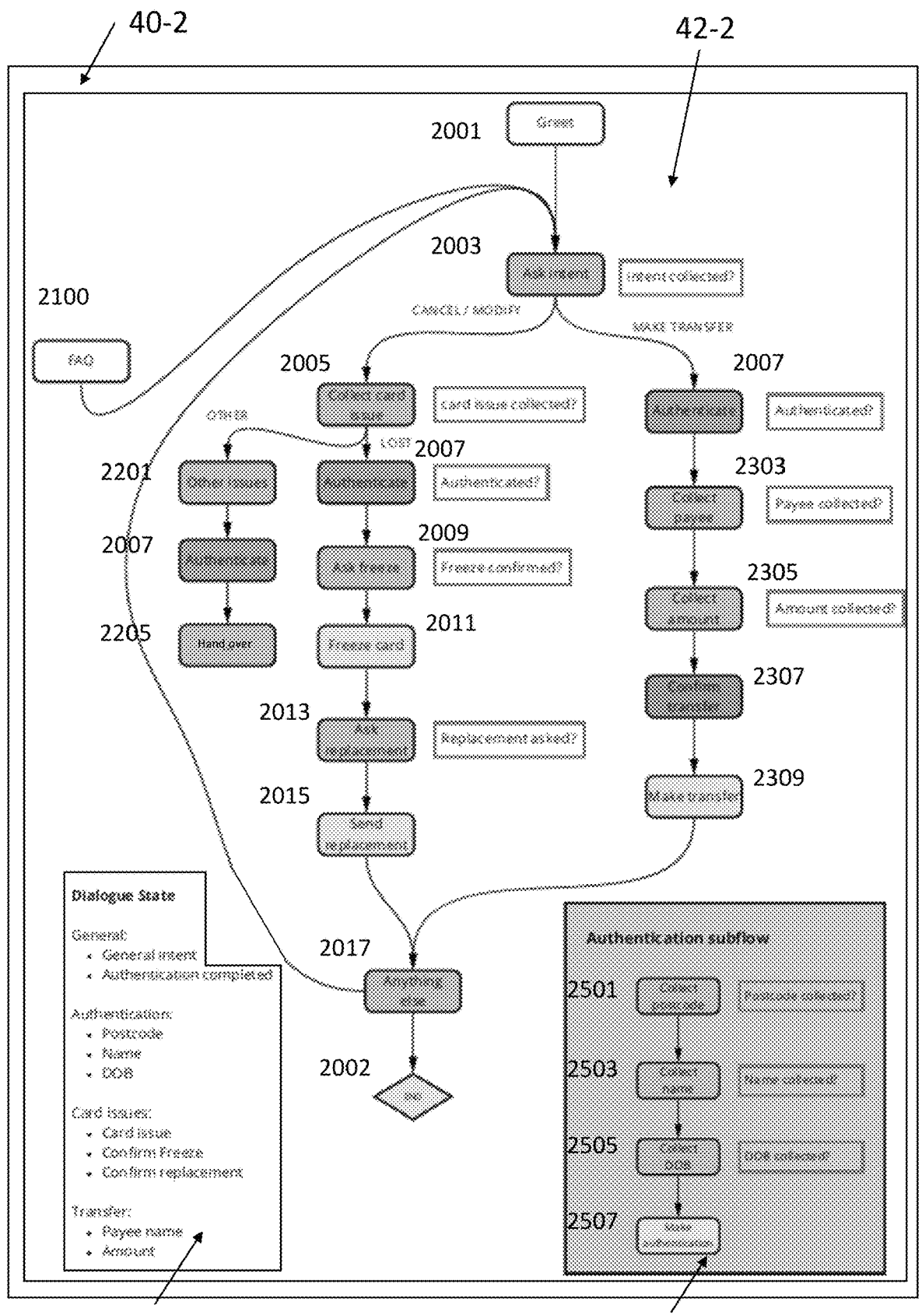
FIG. 8 (a) shows a schematic illustration of a policy module used in a method according to an embodiment for performing a transaction in a banking domain.

In Example 2, an example dialogue between a system and a user for performing a transaction task in the banking domain is performed using a system according to an embodiment. FIG. 8 (a) shows a schematic illustration of various components of a policy module 40-2 included in the system according to an embodiment. The policy module 40-2 is an example policy module 40-2 for performing a transaction in the banking domain.

Figure 8B:
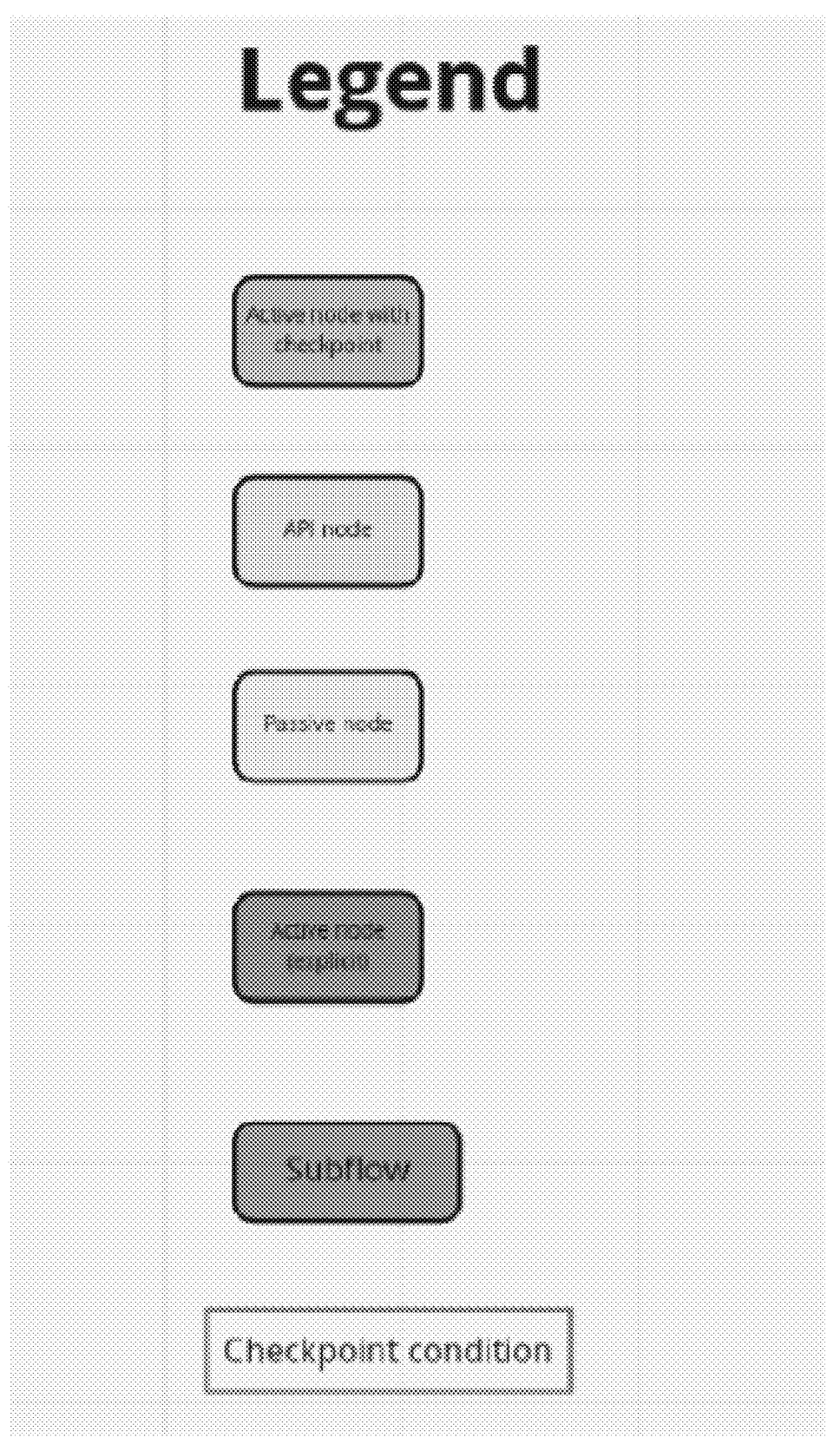

The policy module 40-2 of FIG. 8(a) illustrates checkpoint-based dialogue repositioning and the use of parallel dialogue paths. Checkpoints associated with the different nodes are indicated by text surrounded by a box, e.g. Intent Collected? or Authenticated? . The different types of nodes are shown using different patterns, as illustrated in FIG. 8(b).

In the graph of FIG. 8 (a) (as well as in FIG. 7), the depth of the graph (that is the vertical direction in the figure) represents multi-turn information collection. Nodes stacked in depth allow information collection which occurs turn by turn, or all in the same turn. Checkpoint based repositioning, together with the dialogue state, enables the system to transition to the node that still requires information to be collected in a turn, when starting from a root node.

The breadth of the policy in FIG. 8(a) represents different dialogue paths. For example, different booking intents go down different subflows. In FIG. 8(a), the dialogue for different booking intents progresses according to either nodes 2005 to 2017 (including nodes 2201 to 2205), or nodes 2007 to 2017. In an alternative which is not shown, different API call results may go to different dialogue paths—for example for booking available and for booking not available.

In the graph of FIG. 8(a) (as well as in FIG. 7), after a global transition is performed, the method repositions to a root node. Repositioning starts from the root node, and then the pre-conditions find the node that still requires to collect information. Starting from the root node and given the dialogue state information 55, the pre-conditions allow the node that needs to collect information (i.e. say and listen) in that turn to be found.

The policy module 40-2 comprises stored information relating to the dialogue 41-2. This stored information is updated as has been described previously. The dialogue state information 55 comprises a plurality of slots. For each slot, one or more values may be stored. The dialogue state information 55 in this example comprises the following information: General intent, Authentication completed, Postcode slot, Name slot, DOB slot, Card issue, confirm freeze, confirm replacement, Payee name slot, and amount slot.

The policy module 40-2 further comprises a state machine 42-2 comprising a plurality of nodes. In contrast to the policy module 40 of FIG. 7, the plurality of nodes in the policy module 40-2 is arranged in a dialogue pathway having three branches, all connected from the root node "Greet" 2001.

The state machine 42-2 comprises the following nodes in a first branch:
  Greet node 2001: comprises a transition function "Greet node→Ask Intent node". The Greet node comprises a pre-condition that is met when a greeting has been issued in the current or a previous turn;
  Ask intent node 2003: comprises a say function, a listen function and a transition function that performs:
    If General Intent=Cancel/Modify, then "Ask Intent node→Collect card issue node"; and
    If General Intent=Make Transfer, then "Ask Intent node→Authenticate node",
    The Ask intent node 2003 also comprises a checkpoint pre-condition that is met when the "General intent" slot is filled.
  Collect card issue node 2005: comprises a say function, a listen function and a transition function that performs:
    If Card Issue=Lost, then "Collect card issue node→Authenticate node"; and
    If Card Issue=Other, then "Collect card issue node→Other issues node,
    The Collect Card issue node 2005 comprises a pre-condition that is met when the "Card Issue" slot is filled.
  Authenticate node 2007: comprises a plurality of nodes as shown in authentication subflow 43-2. The authentication subflow 43-2 is described further below. The authenticate node 2007 comprises a local transition to a "Collect postcode node" 2501 in the sub-flow 43-2. The Authenticate node 2007 comprises a pre-condition that is met when the "Authentication completed" slot is filled.
  Ask Freeze node 2009: comprises a say function, a listen function and a transition function "Ask Freeze node→Freeze Card". The Ask Freeze node 2009 comprises a pre-condition that is met when the "Confirm Freeze" slot is filled.
  Freeze card node 2011 comprises a call function, a say function (which confirm that the task has been performed by outputting "Your card has been frozen", for example) and a transition function "Freeze card→Ask Replacement";
  Ask Replacement node 2013: comprises a say function, a listen function and a transition function "Ask Replacement→Send Replacement". Ask Replacement node 2013 comprises a pre-condition that is met when the "Confirm Replacement" slot is filled.
  Send Replacement node 2015 comprises a call function, a say function (which confirms that the task has been performed by outputting "Ok, a replacement card has been sent to your address", for example) and a transition function "Send Replacement→Anything else";
  Anything else node 2017: comprises a say function, a listen function and a transition function "anything else→end";
  End node 2002: comprises no functions.
The second branch comprises the following nodes:
  Other Issues node 2201: further comprises a listen function and a transition function that performs "Other Issues→Authenticate"
  Authenticate node 2007: as described above.
  Handover Node 2205: may represent a call to a human operator, or another service, for example.

The third branch comprises the following nodes:
Authenticate node 2007: as described above.
Collect payee node 2303: comprises a say function, a listen function and a transition function "collect payee→collect amount". The Collect payee node 2303 comprises a pre-condition that is met when the "Payee name" slot is filled.
Collect amount node 2305: comprises a say function, a listen function and a transition function "collect amount→confirm transfer". The Collect amount node 2305 comprises a precondition that is met when the "Amount" slot is filled.
Confirm transfer node 2307: comprises a say function, a listen function and a transition function "confirm transfer-. Make transfer";
Make transfer node 2309: comprises a call function, a say function (which confirms the task has been performed by outputting "Your transfer is complete", for example) and a transition function "Make transfer→anything else".

The above nodes each comprise a transition to a next node, where the transitions flow from the start node 1001 to the end node 1022. This is indicated in FIG. 8 by the solid lines between the nodes, which show the paths of the local transitions.

The following nodes are active nodes with checkpoints: Ask Intent 2003; Collect card issue 2007; Ask Freeze 2009; Ask replacement 2013; Other issues 2201; hand over 2205; Collect payee 2303; Collect amount 2305: Anything else 2017; Collect postcode 2501; Collect name 2503; and Collect DOB 2505. The following node is an active node without a checkpoint: Confirm transfer 2307.

The following nodes are API nodes: Freeze Card 2011; Send Replacement 2015; Make Transfer 2309; and Make authentication 2507. An API node is a node that comprises a call function that calls an API backend.

The following nodes are passive nodes: Greet 2001 and FAQ 2100.

The state machine 42-2 comprises the following node which is not accessed through local transitions, in other words it is not accessed through the transition function of another node:
FAQ node 2100: comprises a say function and transition function "FAQ→Ask Intent";
The FAQ node 2100 is configured to provide a reply to the user in response to some questions.

A single "Authenticate node" 2007 is accessed by a local transition at three different points in the pathway, once in each branch. If the user already authenticates in one pathway during the call, e.g. to make a transfer, and then wants to deal with some other issues, the use credentials are retained, meaning that the pre-conditions skip through the authenticate procedure. Alternatively, a separate authenticate node can be provided in each pathway, meaning that authentication is requested again when the user goes through a different authentication node, and each authenticate node may specify different degrees of authentication, related to the sensitivity of the requested or provided information and intents. The authentication subflow 43-2 comprises the following nodes:
Collect postcode node 2501: comprises a say function, a listen function and a transition function "collect postcode→collect name". The Collect postcode node 2501 comprises a pre-condition that is met when the "Postcode" slot is filled.
Collect name node 2503: comprises a say function, a listen function and a transition function "collect postcode→collect DOB". The Collect name node 2503 comprises a pre-condition that is met when the "Name" slot is filled.
Collect DOB node 2505: comprises a say function, a listen function and a transition function "collect DOB→Make Authentication". The Collect DOB node 2505 comprises a pre-condition that is met when the "DOB" slot is filled.
Make Authentication node 2507: comprises a say function, a call function, an update function and a transition function that performs:
"IF previous transition=Collect card issue node→Authenticate node, THEN Make Authentication node→Ask Freeze",
"IF previous transition=Other Issues→Authenticate, THEN Make Authentication→"hand over" node 2205, and
"IF previous transition=Other Issues→Authenticate, THEN Make Authentication→Collect payee node 2303.

When the call function of the Make Authentication node 2507 has been executed, the update function updates the "Authentication Completed" parameter in the dialogue information 41 with a value (for example "TRUE") to reflect that authentication has been done.

An example dialogue with a user which is performed using the system comprising the policy module 40-2 will now be described.

The dialogue starts at the "Greet" node 2001. The list of global rules is assessed, to determine if any of the conditions are met. At this stage, no conditions are met and no rules trigger. The transition function of the greet node 2001 is executed. The transition function of the greet node 1001 is "Greet node→Ask Intent node". From the greet node 2001, the dialogue policy therefore transitions to the "Ask intent" node 2003. This is a local transition.

It is checked whether the current node is a stop node. Since the "Ask Intent" node 2003 is not a stop node, the dialogue continues. Since an intent has not yet been collected by the system (i.e. the "General intent" slot is empty), no pre-condition is met, and the say function of the "Ask intent" node 2003 is executed. The say function results in a system output of:
System: Hi, welcome to <bank_name>. How can I help?
The "Ask intent" node 2003 also comprises a listen function and this is then executed. The user replies with:
User: I lost my card! Can you freeze it?
A transition is then made to the Greet node 2001 (which is the root node in this example) and the next dialogue turn starts.

The list of global rules is then assessed, to determine if any of the conditions are met. From the user's utterance, values for the General intent (=Cancel/Modify), Card issue (=Lost), and Confirm Freeze slots trigger global rules which update the relevant dialogue state information 55. At this point in the dialogue, the conditions for the following subsequent global rules are also met:
1. If "General intent" slot value is "Cancel/Modify", then go to "Collect card issue" node 2005;
2. If "card issue" slot value is "Lost", then go to "Authenticate" node 2007;
3. If "Confirm Freeze" is "True", then go to "Freeze card" 2011.

The first rule is executed and a global transition to the "Collect card issue" node 2005 is made. Since this node is not a stop node, the dialogue continues. The pre-condition for the "Collect Card issue" node 2005 is met since the "Card issue" slot is filled. Therefore, the "Collect Card issue" node 2005 functions are not performed (the user is not asked for what the card issue is), and the dialogue repositions to the root node, which in this example is the Greet Node 2001. The preconditions are met at the Greet node 2001, so a local transition to the Ask Intent node 2003 is performed. The pre-condition at the Ask intent node 2003 is met, and so a local transition according to the transition information "If General Intent=Cancel/Modify, then "Ask Intent node→Collect card issue node" is performed. The pre-condition for the "Collect Card issue" node 2005 is met since the "Card issue" slot is filled, and so the local transition Collect Card issue→Authenticate is made.

At the Authenticate node 2007, there are no functions, and therefore a local transition to the "Collect postcode node" 2501 in the sub-flow 43-2 is performed. It is checked whether the current node is a stop node. Since the "Collect Postcode" node is not a stop node, the dialogue continues. Since a postcode has not yet been collected by the system (i.e. the "Postcode" slot is empty), no pre-condition is met, and the say function of the "Collect Postcode" node 2501 is executed. The say function results in a system output of:

System: "I can do that, but first I need to authenticate you. What's your postcode?"

The listen function of the Collect Postcode node is then performed. The user replies with:

User: "XYZ123"

A transition is then made to the Greet node 2001 and the next dialogue turn starts.

The list of global rules is then assessed, to determine if any of the conditions are met. At this point in the dialogue, the conditions for the following global rule are met:

4. If "Postcode" has changed, then update "Postcode" slot.

From the user's utterance, the value for the "Postcode" slot (="XYZ123"), is updated in the dialogue state.

No global rules defining a transition are met. At the root node (Greet node 2001), a pre-condition is met since a greeting has been issued previously. The Greet node function is therefore skipped and a transition is made to the Ask Indent node. The function here is also skipped, since an intent has been provided (i.e. slot "General intent" is filled) and a local transition to the Collect Card issue node is made. The Collect card issue node function is skipped (since the "Card Issue" slot is filled) and a transition to the Authenticate node 2007 is made, followed by a transition to the "Collect Postcode" node, at which the precondition is also met (since the "Postcode" slot has been filled). Thus the functions of the Collect Postcode node are skipped and the system transitions to "Collect Name" node. In other words, after repositioning to the root node, the following transitions are made: Greet→Ask Intent→Collect Card Issue→Authenticate→Collect postcode→Collect Name. Other than the Collect Name node, all the nodes listed above are skipped due to their preconditions being met.

At the Collect Name node 2503, it is checked whether the current node is a stop node. Since the node 2503 is not a stop node, the dialogue continues. Since a name has not yet been collected by the system (i.e. the "Name" slot is empty), no pre-condition is met, and the say function of the node 2503 is executed. The say function results in a system output of:

System: "And your full name please?"

The "listen" function of the Collect Name node 2503 is then performed. The User replies with:

User: "John Doe"

A transition is then made to the Greet node 2001 and the next dialogue turn starts.

The list of global rules is then assessed, to determine if any of the conditions are met. At this point in the dialogue, the condition for the following global rule is met:

5. If "Name" has changed, then update "Name" slot.

From the user's utterance, the value for the "Name" slot (="John Doe"), is predicted by the NLU and updated in the dialogue state information 55 by the global rule.

No global rules defining a transition are met. As describe above, the policy module skips through the functions of the nodes connected to the Greet node where the preconditions are met. The following transitions are made: Greet→Ask Intent→Collect Card Issue→Authenticate, and then in the Authenticate subflow. Collect postcode→Collect Name→Collect DOB. Other than the Collect DOB node, the functions of all the nodes listed above are skipped due to their preconditions being met.

At the Collect DOB node, it is checked whether the current node is a stop node. Since the node 2505 is not a stop node, the method continues. Since a DOB has not yet been collected by the system (i.e. the "DOB" slot is empty), no pre-condition is met, and the say function of the node 2505 is executed. The say function results in a system output of:

System: "And what's your date of birth?"

The "listen" function of the Collect DOB node 2505 is then performed. The User replies with:

User: "Sorry, my postcode is actually ZYX321"

A transition is then made to the Greet node 2001 and the next dialogue turn starts.

The list of global rules is then assessed, to determine if any of the conditions are met. At this point in the dialogue, the condition for the following global rule is met:

4. If "Postcode" has changed, then update "Postcode" slot.

No global rules defining a transition are met. As before, the policy module skips though the functions of the nodes where preconditions are met as follows: Greet→Ask Intent→Collect Card Issue→Authenticate, and then in the Authenticate subflow, Collect postcode→Collect Name→Collect DOB. Other than the Collect DOB node, all the nodes listed above are skipped due to their preconditions being met.

At the Collect DOB node, since a DOB has not yet been collected by the system (i.e. the "DOB" slot is empty), no pre-condition is met, and the say function of the node 2505 is executed. The say function results in a system output of:

System: "Got that, and what's your date of birth?"

The "listen" function of the Collect DOB node 2505 is then performed. The User then replies with:

User: "February 28 197"

A transition is then made to the Greet node 2001 and the next dialogue turn starts.

The list of global rules is then assessed, to determine if any of the conditions are met. At this point in the dialogue, the condition for the following global rule is met:

6. If "DOB" has changed, then update "DOB" slot.

At this point in the dialogue, no conditions for a global rule defining a transition are met. The local transition of the root node is thus performed. As before, the policy module skips though the functions of the nodes where preconditions are met as follows: Greet→Ask Intent→Collect Card Issue→Authenticate, and then in the Authenticate subflow, Collect postcode→Collect Name→Collect DOB→Make Authentication. Other than the Make Authentication node, all the nodes listed above are skipped due to their preconditions being met.

At the Make authentication node 2507, since the node is not a stop node, the method continues. An API call is made to perform the authentication. The outcome of the API call is updated in the "Authentication Completed" slot. For example, if the API call provides a positive result (that is the user is in fact authenticated) then the "Authentication Completed" slot is set to a value of "True". A system prompt of "Great, you got authenticated" is accumulated. A local transition according to the transition function "IF previous transition=Collect card issue node→Authenticate node. THEN Make Authentication node→Ask Freeze" is performed.

At the Ask Freeze node 2009, since the Confirm Freeze slot has already been set to "TRUE", the pre-condition is met, and Ask Freeze node 2009 function is skipped and a transition is made to the "Freeze Card" node 2011.

At the Freeze card node 2011, since the node is not a stop node, the method continues. The functions of the Freeze card are executed and in particular, an API call is made to perform freeze the card. Note that a precondition may be included to check if an API call has previously been made. In this case, the precondition is not met and the API call is made.

The Freeze card node does not have a listen( ) function. The system prompt of "Your card has been frozen" is accumulated. The local transition of the Freeze card node is performed: Freeze card→Ask Replacement.

At Ask Replacement node 2013 node, since the "Confirm Replacement" slot has not yet been filled by the system, no pre-condition is met, and the say function of the node 2013 is executed. The say function results in a system output of:

System: "Great, you got authenticated. Your card has been frozen. Shall I send you a replacement card?"

The "listen" function of the Ask Replacement node 2013 is then performed. The User then replies with:

User: "Yes Please"

A transition is then made to the Greet node 2001 and the next dialogue turn starts.

The list of global rules is then assessed, to determine if any of the conditions are met. At this point in the dialogue, the condition for the following global rule is met:

7: If "Confirm Replacement" has changed, then update "Confirm Replacement" slot.

No global rules defining a transition are met. The local transition of the node is then performed: Greet→Ask Intent. The policy module skips though the functions of the nodes where preconditions are met as follows: Greet→Ask Intent→Collect Card Issue→Authenticate→Ask Freeze→Freeze card→Ask Replacement→Send Replacement.

The Send Replacement node 2015 is a node that makes an API call. At the Send Replacement node 2015, the call function is performed since this is the first time that the API call is made. The send Replacement node does not have a listen( ) function. The local transition of the node is then performed: Replacement Node→Anything else At the "Anything Else" node 2017, since the node is not a stop node, the method continues. The "Anything Else" node 2017 may not have any preconditions associated with it. Therefore, the say function of the node 2017 is performed, causing the system to output:

System: "Ok, a replacement card has been sent to your address. Can I help you with anything else?"

The "listen" function of the node 2017 is then performed. The User then replies with:

User: "yes, can you transfer some money to my wife's account?"

A transition is then made to the Greet node 2001 and the next dialogue turn begins.

The list of global rules is again assessed, to determine if any of the conditions are met. At this stage in the dialogue the following condition is met:

8. If "Payee Name" slot is changes, then update "Payee Name" slot

No global rules defining a transition are met. Local transitions are made to the Authenticate node 2007. The Authenticate node 2007 is not a stop node, so the method continues and pre-conditions are checked. Since the "Authentication completed" slot has a value of TRUE, the precondition for this node is met and a local transition to the "Collect payee" node 2303 is made. At the "Collect payee" node 2303, the precondition that the "Payee name" is filled is met so the Collect payee node function is skipped and a local transition to the Collect amount node 2305 is made.

At the collect amount node 2305, the say function is performed resulting in a system output of:

System: "Sure, how much do you want to transfer?"

The "listen" function of the node 2305 is then performed. The User then replies with:

User: "How long will the replacement card take to arrive?

A transition is then made to the Greet node 2001 and the next dialogue turn begins.

The list of global rules is again assessed, to determine if any of the conditions are met. At this stage in the dialogue the following condition is met:

9. If user asks a frequently asked question, go to FAQ node 2100.

The above rule (rule 9) is then executed and a transition is made to the FAQ node 2100. The FAQ node is not a stop node so the method continues. The FAQ node may not have any preconditions associated with it so the say function of the node 2100 is performed. The say function of the node 2100 causes the system to output:

System: "The replacement card will take between 1 and 2 weeks to arrive".

The FAQ node listen function is performed. The user then says:

User: "And how much is the maximum amount I can transfer?"

A transition is then made to the Greet node 2001 and the next dialogue turn begins.

The list of global rules is again assessed, to determine if any of the conditions are met. At this stage in the dialogue the following condition is met:

9. If user asks a frequently asked question, go to FAQ node 2100.

The above rule (rule 9) is then executed and a transition is made to the FAQ node 2100. The FAQ node is not a stop node so the method continues. The FAQ node does not have any preconditions associated with it so the say function of the node 2100 is performed. The say function of the node 2100 causes the system to output:

System: "You can transfer up to 1000£".

Note that the say function of the FAQ node 2001 may comprise logical statements that enable it to provide different responses based on the query. The listen function is performed. The user then says:

User: "Ok, so transfer 400£, that should be enough"

A transition is then made to the Greet node 2001 and the next dialogue turn begins.

The list of global rules is again assessed, to determine if any of the conditions are met. At this stage in the dialogue the following condition is met:

10. If "Amount" value has changed, then update "Amount" slot.

The "Amount" slot is updated to the value of £400 in the Dialogue State and local transitions are made to the "Confirm Transfer" node 2307, skipping through the node functions.

The "Confirm Transfer" node 2307 has preconditions associated with it to check if an explicit confirmation for this payee and amount has been provided. At this stage, this condition is not met and the functions of the node are executed. At the "Confirm Transfer" node, the node is say( ) function is executed and the system outputs:

System: "So you want to transfer 400£ to your wife, is that right?"

The "listen" function of the node 2307 is then performed.
The User then replies with:
User: "Actually make it 500£ just in case."

A transition is then made to the Greet node 2001 and the next dialogue turn starts.

The list of global rules is again assessed, to determine if any of the conditions are met. At this stage in the dialogue the following condition is met (since the amount has changed):

10. If "Amount" value has changed, then update "Amount" slot.

The "Amount" slot is updated in the Dialogue State 55 and local transitions are made to the "Confirm Transfer" node 2307, skipping through the node functions. At the "Confirm Transfer" node, the node is say( ) function is executed and the system outputs:

System: "Sure, you want to transfer 500£ to your wife then?

The "listen" function of the node 2307 is then performed.
The User then replies with:
User: "yes, make the transfer".

A transition is then made to the Greet node 2001 and the next dialogue turn starts.

The list of global rules is again assessed, to determine if any of the conditions are met. At this stage in the dialogue no condition for a global transition is met. From the Greet node 2001, the policy skips through functions nodes where preconditions are met. The transitions are: Greet Node→Ask Intent→Authenticate→Collect Payee→Collect Amount→Confirm transfer→Make transfer.

The call function of the Make transfer node is executed to perform an API call that executes the transfer. The say function of the "Make Transfer" node 2309 is then performed to cause the system to output:

System: "Your transfer is complete"

The Make transfer node 2309 does not have a listen( ) function. The local transition from the Make transfer node is therefore performed: Make transfer→Anything else. At the anything else node, the dialogue may proceed.

FIG. 8 (*b*) shows the legend used to illustrate the different component in the policy module of FIG. 8 (*a*). Active nodes with checkpoints, API nodes, Passive nodes, Active node (explicit), nodes that represent subflows ("Subflow"), and checkpoint conditions are shown with different patterns.

Example 3

Figure 9:
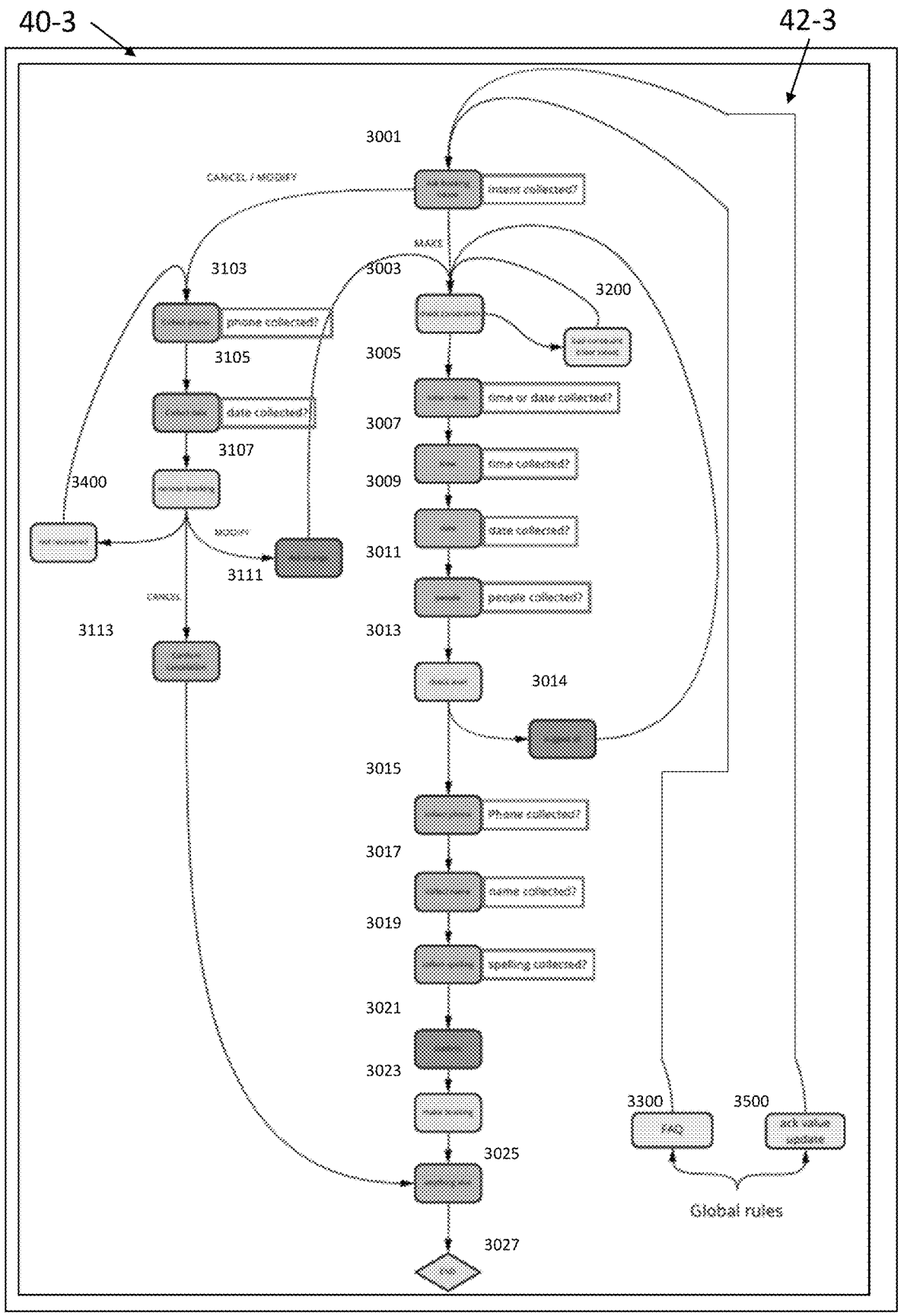
FIG. 9 shows a schematic illustration of a policy module used in a method according to an embodiment for a booking task in the restaurant domain.

Example 3 is an example of a policy module for performing a dialogue between a system and a user for a booking task in the restaurant domain using a system according to an embodiment. FIG. 9 shows a schematic illustration of various components of a policy module 40-3 included in the system according to an embodiment. The policy module 40-3 is an example policy module 40-3 for the booking task in the restaurant domain.

The policy module 40-3 of FIG. 9 illustrates checkpoint-based dialogue repositioning and the use of parallel dialogue paths. Checkpoints associated with the different nodes are indicated by text surrounded by a box, e.g. Intent Collected ? or date collected ?. The different types of nodes are shown using different patterns, as illustrated in FIG. 8(*b*). The breadth of the policy in FIG. 9 represents different dialogue paths. In FIG. 9 the dialogue for different booking intents progresses according to either nodes 3103 to 3113 (including nodes 3400 to 3111), or nodes 3003 to 3027 (including nodes 3200 and 3014).

The policy module 40-3 comprises stored information relating to the dialogue (not shown). This stored information is updated as has been described previously.

The policy module 40-3 further comprises a state machine 42-3 comprising a plurality of nodes.

The state machine 42-3 comprises the following nodes:

Ask booking intent node 3001: comprises a say function, a listen function and a transition function that performs:
  If Intent=Cancel/Modify, then "Ask booking Intent node→Collect phone"; and
  If Intent=Make, then "Ask booking Intent node→check constraints";
The Ask booking intent node 3001 also comprises an "Intent Collected" checkpoint pre-condition that is met an intent is provided by the user.

Check constraints node 3003: comprises a call function, and a transition function that performs either the transition Check Constraints→Date+Time 3005, or Check Constraints→Clear Value 3200

Bad constraint (clear value) node 3200: comprises a say function, a function updating the dialogue information 41 and a transition function that performs Bad constraint (clear value) 3200→Check constraints Time+Date 3005: comprises a say function, a listen function and a transition function that performs Time+Date 3005→Time 3007. The node 3005 also comprises a "time or date Collected?" checkpoint pre-condition that is met a time or date value has been provided by the user and is stored.

Time 3007 comprises a say function, a listen function and a transition function that performs Time 3007→Date 3009. The node 3007 also comprises a "time Collected?" checkpoint pre-condition that is met if a time has been provided by the user and is stored.

Date 3009 comprises a say function, a listen function and a transition function that performs Date 3009→people 3011. The node 3009 also comprises a "date Collected?" checkpoint pre-condition that is met if a date has been provided by the user and is stored.

People 3011 comprises a say function, a listen function and a transition function that performs people 3011→check avail 3013. The node 3011 also comprises a "people Collected?" checkpoint pre-condition that is met if the number of people has been provided by the user and is stored.

Check avail 3013 comprises a call function, and a transition function that performs check avail 3013→collect phone 3015 or check avail 3013→suggest alt 3014.

Suggest alt 3014 comprises a say function, a listen function and a transition function that performs suggest alt 3014→check constraints 3003

Collect phone 3015 comprises a say function, a listen function and a transition function that performs collect phone 3015→collect name 3017. The node 3015 also comprises a "Phone Collected?" checkpoint pre-condition that is met if a phone number has been provided by the user and is stored.

Collect name 3017 comprises a say function, a listen function and a transition function that performs collect name 3017→collect spelling 3019. The node 3017 also comprises a "name Collected?" checkpoint pre-condition that is met if a name has been provided by the user and is stored.

Collect spelling 3019 comprises a say function, a listen function and a transition function that performs collect spelling 3019→confirm 3021. The node 3019 also comprises a "spelling Collected?" checkpoint pre-condition that is met if a spelling has been provided by the user and is stored.

Confirm node 3021 comprises a say function, a listen function and a transition function that performs confirm node 3021→make booking 3023.

Make booking node 3023 comprises a call function, and a transition function that performs Make booking 3023→anything else 3025.

Anything else node 3025 comprises a say function, a listen function and a transition function that performs Anything else 3025→End 3027.

Collect phone node 3103: comprises a say function, a listen function and a transition function that performs collect phone 3103→collect date 3105. The node 3103 also comprises a "phone Collected?" checkpoint pre-condition that is met if a phone number has been provided by the user and is stored.

Collect Date 3105 comprises a say function, a listen function and a transition function that performs Collect Date 3105→recover booking 3107. The node 3105 also comprises a "date Collected?" checkpoint pre-condition that is met if a date has been provided by the user and is stored.

recover booking node 3107: comprises a call function, and a transition function that performs:
  recover booking node 3107→Ask Change 3111, if the user has indicated he wishes to modify the booking; or
  recover booking node 3107→Confirm cancellation 3113, if the user has indicated he wishes to cancel the booking;
  recover booking node 3107→Not recovered node 3400, if the call function indicates that no booking has been recovered.

Confirm Cancellation node 3113 comprises a say function, a listen function and a transition function that performs Confirm Cancellation node 3113→Anything else 3025

Ask change node 3111 comprises a say function, a listen function and a transition function that performs Ask change node 3111→Check constraints node 3003.

Not recovered node 3400: comprises a say function, and a transition function that performs Not recovered node 3400→Collect phone 3103.

The state machine 42-3 comprises the following node which is not accessed through local transitions, in other words it is not accessed through the transition function of another node:
  FAQ node 3300: comprises a say function and transition function FAQ 3300→Ask booking intent 3001';

The FAQ node 3300 is configured to provide a reply to the user in response to some questions.

Ack value update node 3500: comprises a say function and transition function "Ack value update 3300→Ask booking intent 3001";

The Ack value update node 3500 is configured to provide a message to the user acknowledging when a value has been updated.

In FIG. 9, the root node is the Ask Booking Intent node 3001.

Figure 10:
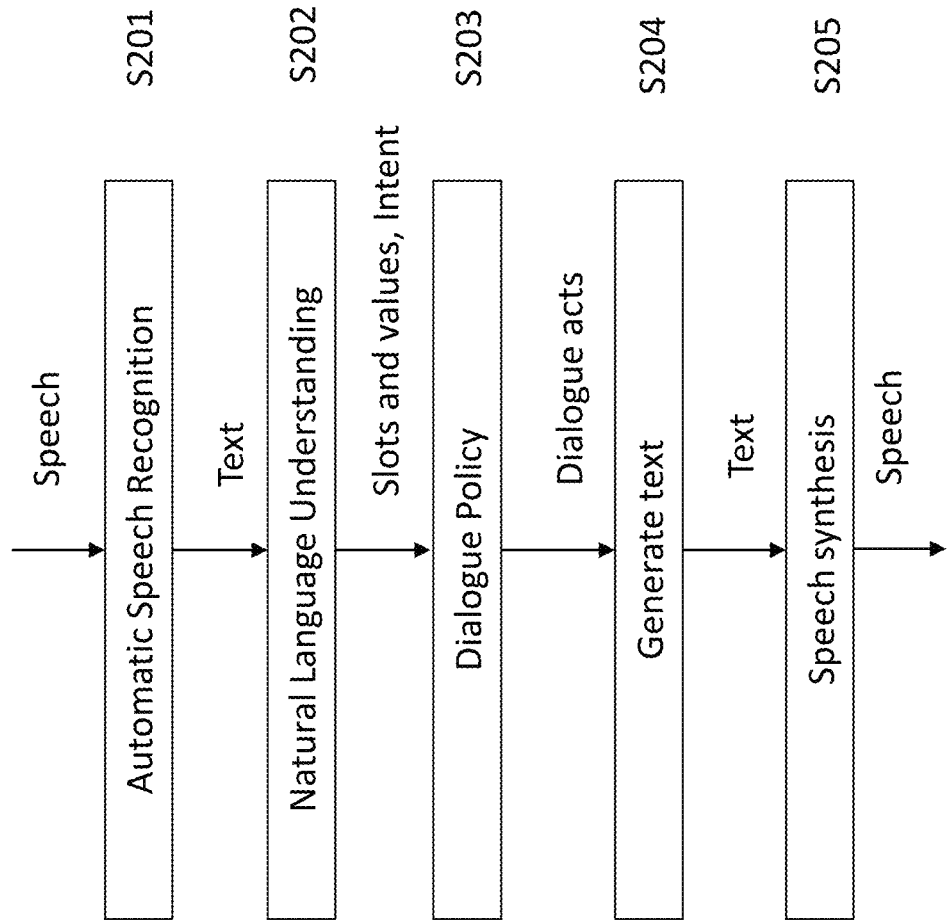
FIG. 10 shows a schematic illustration of a method according to an embodiment.

FIG. 10 shows a schematic illustration of a method according to an embodiment, in which a dialogue system interacts with a human user. The method may be performed on a dialogue system such as has been described in relation to FIG. 1. The method is a goal-oriented dialogue method. The term goal-oriented may be used interchangeably with the term task-oriented. Goal-oriented dialogue systems can be used to search and interact with large databases that contain information about a specific dialogue domain. Examples of such domains are 1) restaurant search and reservation, 2) flight bookings, 3) tourist information, 4) laptop shopping, and 5) train ticket sales, amongst others.

The input in this example is an audio input from a human user. The audio input may be received through a microphone located remotely from the dialogue system 100, and the audio signal transmitted to the dialogue system for example. Each audio input corresponds to a turn in the dialogue. A dialogue turn comprises the previous system utterance and the current user utterance.

In S201, an automatic speech recognition (ASR) step is performed, to generate a text signal from the audio input. Any type of speech recognition process may be used in the speech recognition step. For example, a trained speech recognition algorithm based on a neural network or Hidden Markov Model may be used. ASR models may assign posterior probabilities to words in an utterance given the input acoustic signal. The ASR output takes the form of an N-best list, which approximates the full posterior distributions over the ASR hypotheses by returning the top N most probable hypotheses with their respective probabilities. Alternatively, word lattices or word confusion networks may be used. In this example, only the top scoring ASR hypothesis determined in S201 is used as input to the subsequent steps (N=1).

Where the user input is a text signal, the ASR step S201 is omitted, and the text signal taken directly as input to S202.

A natural language understanding (NLU) step S202 is then performed on the text signal. In this step, a text signal (output from the ASR step S201 in this example) is converted into turn level dialogue state information. The turn level dialogue state information may comprise values corresponding to slots. The step S202 outputs one or more slot values corresponding to the user input. This gives a "turn-level" prediction, comprising one or more slot values extracted from the text signal corresponding to the user input for the dialogue turn.

Slots and values will now be described. Each dialogue domain is defined by a domain ontology. The domain ontology comprises information which can be used to model the user goal expressed up to a given point of the conversation. This point of the conversation is referred to as a "dialogue state". The domain ontology comprises one or more slots. Each dialogue slot corresponds to a subject that a speech signal may relate to, such as the party size for a restaurant booking for example. The dialogue slot may take on one or more "values". The term "value" is used here to refer to any information that fills the slot, and is not limited to numbers. For example, where the text signal corresponding to the user input is "I would like a table for 4 people please", the NLU process in step S202 extracts a "party size" slot with the value "4". If the next user input is "Oh actually, make that 5 people", the NLU process in step S202 should extract the "party size" slot with the value "5". Similarly, where the user input is "Cool, book me at 5 pm", the NLU process in step S202 should extract the slot "booking time" with the value "5 pm", and so on. For each dialogue turn, step S202 stores a set of one or more pre-defined slots and/or values extracted from the user input. The result is stored in a Turn object. These values are the turn level dialogue state information.

A dialogue state comprises a set of one or more slots with their corresponding slot values. For example, a dialogue state can be specified by the fact that both food type and price range are known at that point in the dialogue, so both a food type slot and a price range slot have a corresponding value (e.g "Thai" or "Chinese, and "cheap" or "expensive"). The set of slots is chosen based on the domain.

A dialogue system for restaurant search and reservation should help the users to find and book a restaurant according to their personal taste and wishes. For example the system should book a place with cheap Thai food in central Cambridge, or recommend a cheap Chinese place in North Cambridge if the user makes inquiries about such places. Slot labelling or slot filling is a component used in a task-oriented dialog system. Its goal is to fill the correct values associated with a set of one or more predefined slots. For example, a dialogue system for restaurant bookings is expected to fill slots such as date, time, and the number of guests with the values extracted from a user utterance (e.g., next Thursday, 7 pm, 4 people).

The NLU process in S202 may use rule-based methods such as template matching or grammar-based methods for example to extract the slot values. Alternatively, data-driven methods can be used, in which statistical models learn from annotated data. Techniques including Inductive Logic Programming, Generative Probabilistic Models, Weighted Finite State Transducers, Support Vector Machines and many others may be used for example. The NLU process in S202 may also be treated as a sequence labelling problem, where each word in an utterance is labelled according to its role in the user's intent. Labelling models such as Conditional Random Fields or Recurrent Neural Networks can be used.

An example method of extracting the slot values from the user utterance is described below, but as may be appreciated, other methods of NLU may be used in S202.

The example NLU module comprises a plurality of independent binary statistical models (for example artificial neural networks), each trained to decide whether a specific slot-value pair was expressed in an input user utterance. Given annotated training data, these models can learn which lexical features are good indicators for a given value and can capture elements of paraphrasing. During inference, features representing the input text signal from S201 are extracted and inputted into the binary models. For example, vector representations of words in the utterance may first be extracted. A single fixed length feature vector representing the utterance may then be generated from the vector representations, for example using a convolutional neural network. Features from the previous system act may also be included. Each model gives a binary output, indicating a probability that the value of the slot value pair corresponding to the model was expressed in the utterance. The NLU module therefore outputs a probability value corresponding to each slot value pair, indicating the probability that the value was mentioned.

During training, the same features are extracted and inputted into the binary models. Again, each model gives a binary output, indicating a probability that the value of the slot value pair corresponding to the model was expressed in the training utterance. The training data further comprises labels indicating the slots and values mentioned in the utterance, and these are therefore used to train the models to correctly determine whether the slot value pair was expressed in the utterance.

In this example, the NLU module therefore outputs in S202 a probability value corresponding to each slot value pair. These outputs are then used to determine a list of slot values expressed in the utterance—for example, the slot values having a probability over a certain threshold value are taken. Other types of NLU may be performed however, resulting in different format outputs.

In S202, for each user input (each dialogue turn), a set of one or more values, each corresponding to a slot, is outputted and stored in the current turn information 51 in the dialogue information 41. This information is then used in S203, for example to determine whether the condition of one or more global rules is fulfilled as has been described previously. For example, the global rules of the dialogue policy may contain an action to update the values of the slots in the dialogue state information 55 if a condition has been met, as described previously.

As well as outputting slots and values, the NLU step S202 may also output intent information. For example, features representing the input text signal from S201 are extracted and inputted into one or more intent classifiers. The same features that are used to identify the slot values may also be taken as input to the intent classifiers. For example, vector representations of words in the utterance may first be extracted. A single fixed length feature vector representing the utterance may then be generated from the vector representations, for example using a convolutional neural network. Features from the previous system act may also be included. The resulting vector is taken as input to an intent classifier. One or more intent classifiers may be used.

In an example, the system uses four dedicated intent classifiers in step S202 for discrete intent classification. In this example, there is a binary classifier, i.e., the output of the classifier is 1 (intent detected) or 0 (no intent detected)), for each of four discrete intents:

1) restarting the conversation;
2) what is the address:
3) what are the opening hours; and
4) ask manager.

The actual classifier architecture can be, for example, a one-layer neural network classifier with ReLu non-linear activation function and a 100-dimensional hidden layer. A sigmoid function is used at the output layer and the training objective used is a (binary) cross-entropy loss function. The classifiers are trained on a set of positive and negative examples. A set of positive examples for each intent is manually created (e.g., for the restart classifier positive examples are "Let's start again", "Restart", "Start over", "Let's do it again"), while a set of negative examples may be randomly sampled from the pool of available responses. Alternatively, instead of multiple binary classifiers, a single multi-class intent detector based on a neural network may be used.

Thus in this example, for each dialogue turn, turn level dialogue state information comprising one or more slot values and/or one or more detected intents is output from S202. This information is stored in the current turn information 51 in the dialogue information 41, and used by the dialogue policy module in S203 to determine a dialogue act. The method does not use a Dialogue State Tracking (DST) module, rather the dialogue state information 55 is updated by the global rule actions and the node functions of the dialogue policy module 40. This may mean a reduced execution time for storing data to and retrieving data from the stored dialogue information 41.

A dialogue management step is performed in S203, in which a dialogue act is determined. The dialogue information determined in S202 is taken as input. Other information may also be extracted from the input utterance and inputted to the dialogue policy 40. In S203, an appropriate system response is selected following the latest user utterance, as has been described previously. The dialogue policy module 40 uses the updated dialogue information 41 to determine the dialogue act, which is the dialogue act representation of the dialogue system's response to the user utterance.

A set of pre-defined dialogue act types are used to generate the system dialogue acts. As has been described previously, the dialogue act to be performed is specified by the functions in the nodes. In particular, a node may comprise a "say" function, which specifies an output dialogue act for the system. Dialogue acts may comprise an utterance and an argument. The argument may be empty, for example where the act type is "say greeting". In task-based systems, the argument may be one or more slot-value pairs. For request acts, the dialogue act argument may be an attribute of an entity. Examples of dialogue acts include "say inform (food=British)" or "say request(address)".

The selected dialogue act gives a textual response. For example, and as described above, a text template in the utterance is combined with the argument to give the output text in S204.

The text signal generated in S204 may be directly outputted to the user, or may be converted into an audio speech signal, using a text to speech generation process. In this case, in S205, text to speech generation is performed to generate a speech signal, which is then output to the user as an audio signal. Any type of text to speech generation process may be used in this step. This step may alternatively be omitted, and the text signal output directly to the user, on a screen for example. Operating with text output can also allow hearing impaired people to use the system for example.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A dialogue system comprising:
an input for obtaining an input signal relating to speech or text input provided by a user;
an output for outputting speech or text information specified by a determined dialogue act; and
a processor configured to:
  determine dialogue information from the input signal;
  determine the dialogue act based on the determined dialogue information, wherein determining the dialogue act comprises:
    selecting a next state from a plurality of states, wherein each of the plurality of states comprises information specifying a dialogue act and transition information specifying a transition to another state, the transitions defining one or more dialogue pathways, wherein selecting the next state comprises selecting a state which is specified by the transition information in a current state or selecting a state which is specified by a rule in a first set of one or more rules; and
  responsive to determining that a first condition specified by a first rule in the first set is met:
    updating the dialogue information as specified by the first rule; or
    selecting a state which is specified by the first rule as the next state.

2. The dialogue system according to claim 1, wherein determining the dialogue act uses a state machine comprising the plurality of states, wherein the current state represents a current point in the dialogue, the processor further configured to perform a transition of the state machine from the current state to the next state.

3. The dialogue system according to claim 2, wherein the state machine further comprises an additional state which does not comprise information specifying a dialogue act, wherein the additional state comprises information specifying a function.

4. The dialogue system according to claim 3, wherein the first set comprises a first rule specifying the additional state, the processor further configured to:
responsive to determining that a first condition specified by the first rule is met:
  perform a transition of the state machine from the current state to the additional state;
  perform the function specified in the additional state;
  perform a transition of the state machine from the additional state to the next state.

5. The dialogue system according to claim 3, wherein the function specified in the additional state comprises exchanging information with a database.

6. The dialogue system according to claim 2, wherein determining the dialogue act comprises:
performing a transition of the state machine from the current state to an intermediate state;
performing a transition of the state machine from the intermediate state to the next state;
wherein the dialogue act is determined by combining the dialogue act specified in the intermediate state and the dialogue act specified in the next state.

7. The dialogue system according to claim 1, wherein selecting the next state from a plurality of states further comprises:
performing a transition from the current state to an intermediate state comprising information specifying a first dialogue act;
determining whether the dialogue information comprises information associated with the first dialogue act;
responsive to determining that the dialogue information comprises information associated with the first dialogue act, selecting a state which is specified by the transition information in the intermediate state as the next state.

8. The dialogue system according to claim 7, wherein if the dialogue information does not comprise information associated with the first dialogue act, the intermediate state is selected as the next state and the dialogue act specified in the intermediate state is selected.

9. The dialogue system according to claim 1, wherein selecting the next state comprises:

determining whether one or more conditions specified in the first set of one or more rules are met and selecting the state based on the determination.

10. The dialogue system according to claim 2, wherein selecting the next state comprises:
    determining whether the current state is indicated as skipped in any of the first set of one or more rules;
    responsive to determining that the current state is indicated as skipped in all of the first set of one or more rules, selecting the state which is specified by the transition information in the current state.

11. The dialogue system according to claim 1, wherein the first set comprises a first rule specifying a first state, wherein selecting the next state comprises:
    determining whether one or more conditions specified in the first set of one or more rules are met; and
    responsive to determining that a condition specified in the first rule is met, selecting the first state.

12. The dialogue system according to claim 2, wherein each time an input signal is provided by the user, the next state is selected by:
    determining whether the current state is indicated as skipped in any of the first set of one or more rules;
    responsive to determining that the current state is not indicated as skipped in one or more of the first set of one or more rules, determining whether one or more conditions specified in the one or more rules are met and selecting the state based on the determination.

13. A computer implemented method comprising:
    obtaining, by way of an input, an input signal relating to speech or text input provided by a user;
    determining dialogue information from the input signal;
    determining a dialogue act based on the determined dialogue information; and
    outputting, by way of the output, speech or text information specified by the determined dialogue act, wherein determining the dialogue act comprises:
        selecting a next state from a plurality of states, wherein each of the plurality of states comprises information specifying a dialogue act and transition information specifying a transition to another state, the transitions defining one or more dialogue pathways, wherein selecting the next state comprises selecting a state which is specified by the transition information in a current state or selecting a state which is specified by a rule in a first set of one or more rules; and
        responsive to determining that a first condition specified by a first rule in the first set is met:
            updating the dialogue information as specified by the first rule; or
            selecting a state which is specified by the first rule as the next state.

14. A non-transitory computer readable storage medium comprising computer readable code configured to cause a computer to perform the following:
    obtaining, by way of an input, an input signal relating to speech or text input provided by a user;
    determining dialogue information from the input signal;
    determining a dialogue act based on the determined dialogue information; and
    outputting, by way of the output, speech or text information specified by the determined dialogue act, wherein determining the dialogue act comprises:
        selecting a next state from a plurality of states, wherein each of the plurality of states comprises information specifying a dialogue act and transition information specifying a transition to another state, the transition defining one or more dialogue pathways wherein selecting the next state comprises selecting a state which is specified by the transition information in a current state or selecting a state which is specified by a rule in a first set of one or more rules; and
        responsive to determining that a first condition specified by a first rule in the first set is met:
            updating the dialogue information as specified by the first rule; or
            selecting a state which is specified by the first rule as the next state.

15. A dialogue system comprising:
    an input for obtaining an input signal relating to speech or text input provided by a user;
    an output for outputting speech or text information specified by a determined dialogue act; and
    a processor configured to:
        determine dialogue information from the input signal;
        determine the dialogue act based on the determined dialogue information, wherein determining the dialogue act comprises:
            selecting a next state from a plurality of states, wherein each of the plurality of states comprises information specifying a dialogue act and transition information specifying a transition to another state, the transitions defining one or more dialogue pathways,
    wherein selecting the next state comprises selecting a state which is specified by the transition information in a current state or selecting a state which is specified by a rule in a first set of one or more rules, and
    wherein selecting the next state comprises determining whether one or more conditions specified in the first set of one or more rules are met and selecting the state based on the determination.

* * * * *

UNITED STATES PATENT AND TRADEMARK OFFICE
CERTIFICATE OF CORRECTION

PATENT NO. : 11,430,446 B1
APPLICATION NO. : 17/400406
DATED : August 30, 2022
INVENTOR(S) : Tsung-Hsien Wen et al.

It is certified that error appears in the above-identified patent and that said Letters Patent is hereby corrected as shown below:

On the Title Page

Item [30], insert:
-- May 12, 2021 (EP) .......................... 21382443.6 --

Signed and Sealed this
Twentieth Day of December, 2022

Katherine Kelly Vidal
*Director of the United States Patent and Trademark Office*